(12) United States Patent
Trombatore et al.

(10) Patent No.: US 11,480,283 B2
(45) Date of Patent: Oct. 25, 2022

(54) DEFORMABLE GASKET FOR THE SEALED PASSAGE OF A FLUID THROUGH A WALL

(71) Applicants: Giuseppe Trombatore, Rosolini (IT); Giovanni Trombatore, Rosolini (IT)

(72) Inventors: Giuseppe Trombatore, Rosolini (IT); Giovanni Trombatore, Rosolini (IT)

(73) Assignee: Giuseppe Trombatore, Rosolini (IT)

( * ) Notice: Subject to any disclaimer, the term of this patent is extended or adjusted under 35 U.S.C. 154(b) by 778 days.

(21) Appl. No.: 16/345,962

(22) PCT Filed: Nov. 8, 2017

(86) PCT No.: PCT/IB2017/056986
§ 371 (c)(1),
(2) Date: Apr. 29, 2019

(87) PCT Pub. No.: WO2018/087673
PCT Pub. Date: May 17, 2018

(65) Prior Publication Data
US 2020/0056733 A1     Feb. 20, 2020

(30) Foreign Application Priority Data
Nov. 9, 2016  (IT) .......................... 102016000113022

(51) Int. Cl.
*F16L 41/14* (2006.01)
*F16J 15/08* (2006.01)

(52) U.S. Cl.
CPC ........... *F16L 41/14* (2013.01); *F16J 15/0818* (2013.01)

(58) Field of Classification Search
CPC ....... F16L 41/00; F16L 41/005; F16L 41/045; F16L 41/04; F16L 41/065; F16L 41/08; F16L 41/088; F16L 41/14; F16L 51/00; F16L 51/02; F16L 51/024; F16L 51/04; F16L 51/022; F16L 47/26; F16L 47/28; F16L 47/34
(Continued)

(56) References Cited

U.S. PATENT DOCUMENTS

| 2,481,142 | A | 9/1949 | Mueller et al. |
| 3,879,065 | A | 4/1975 | Kobayashi |
| 9,187,887 | B2 * | 11/2015 | Coronado ............... F16L 47/32 |

FOREIGN PATENT DOCUMENTS

| EP | 0080546 A1 | 6/1983 |
| EP | 1301739 B1 | 8/2005 |

(Continued)

OTHER PUBLICATIONS

International Search Report and Written Opinion for Corresponding International Application No. PCT/IB2017/056986 (dated Feb. 2, 2018) (14 Pages).

*Primary Examiner* — Aaron M Dunwoody
(74) *Attorney, Agent, or Firm* — Lucas & Mercanti, LLP

(57) ABSTRACT

A gasket for use with a connector assembly apt to allow the sealed passage of a fluid through a wall (P) and suitable for installation realized from just one side of the wall, which gasket has a deformable region is provided. The gasket is configured to assume an installation configuration, in which the gasket can be introduced into a connector seat (D) formed in the wall (P), crossing it from side to side, and a sealing configuration, wherein the gasket is installed in the wall (P) and deformed, at the deformable region, to abut on an inside mouthpiece of the connector seat.

16 Claims, 30 Drawing Sheets

(58) Field of Classification Search
USPC .... 285/215, 216, 217, 220, 204, 139.2, 338,
285/223, 225, 226, 229
See application file for complete search history.

(56) References Cited

FOREIGN PATENT DOCUMENTS

| | | | |
|---|---|---|---|
| FR | 2269673 | A2 | 11/1975 |
| FR | 2822921 | A1 | 10/2002 |
| GB | 115310 | A | 5/1918 |
| GB | 274729 | A | 7/1927 |
| KR | 20080033131 | A | 4/2008 |

\* cited by examiner

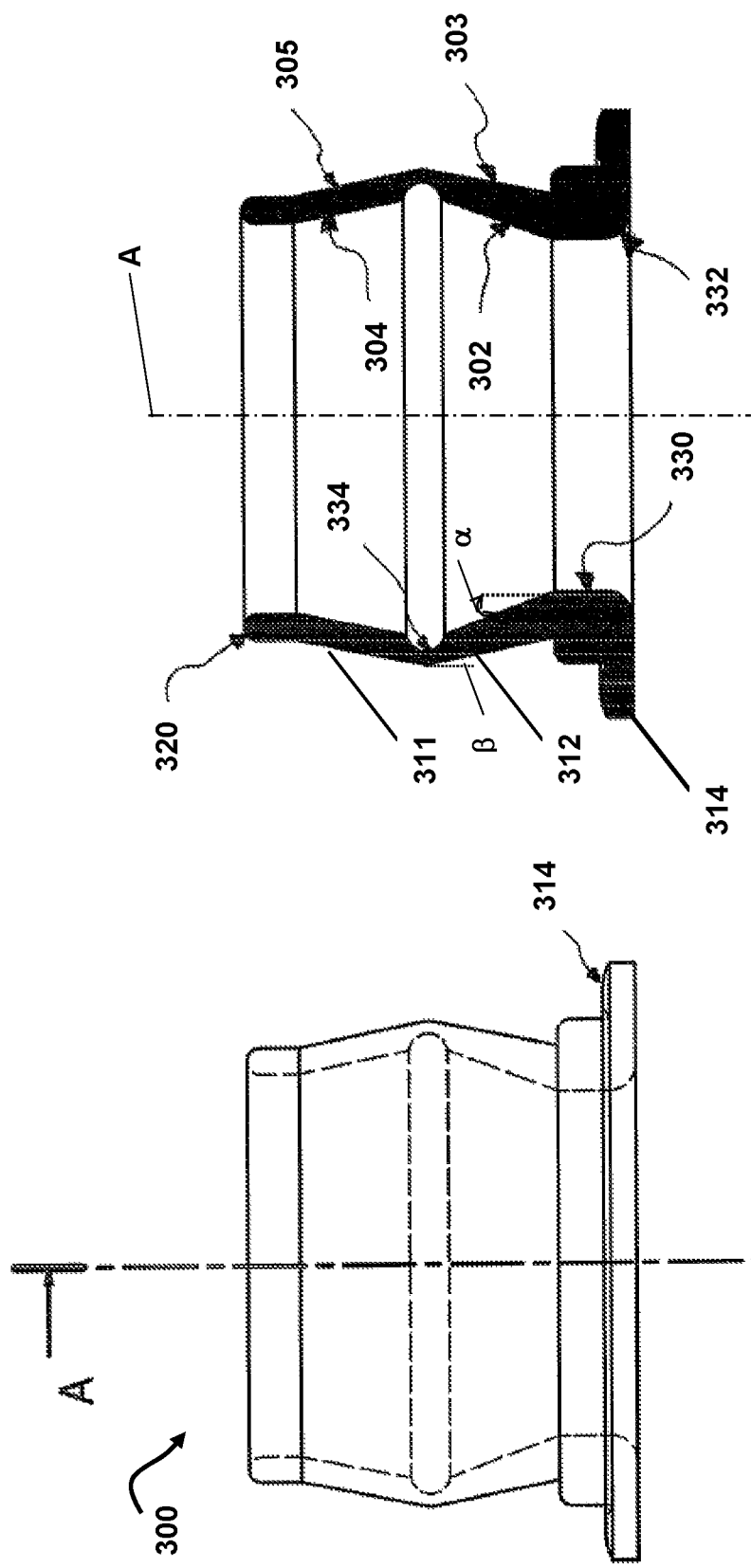

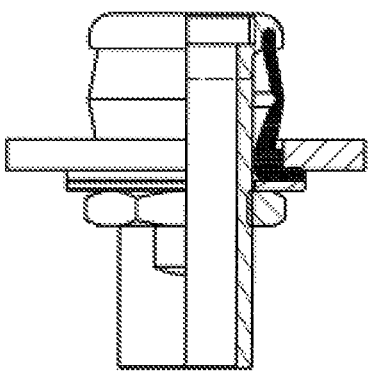
FIG. 9A
FIG. 9B
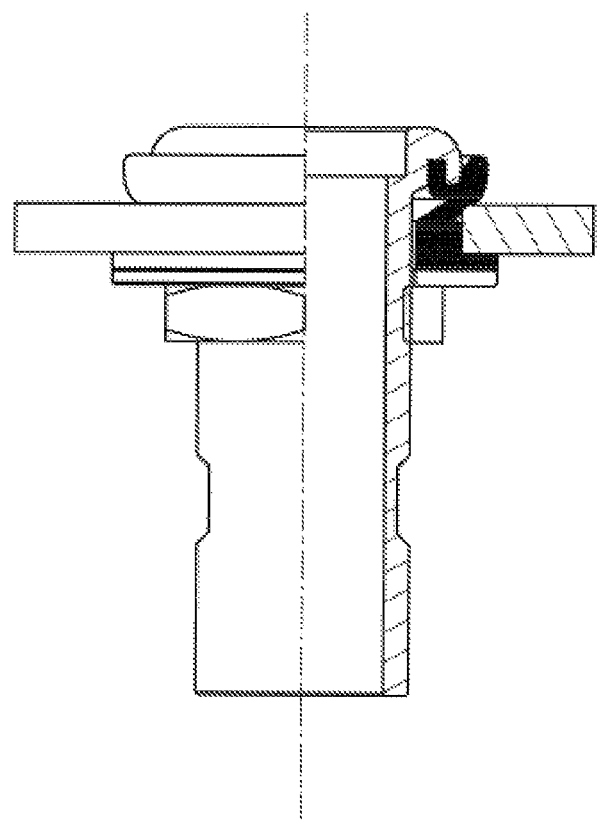
FIG. 9C

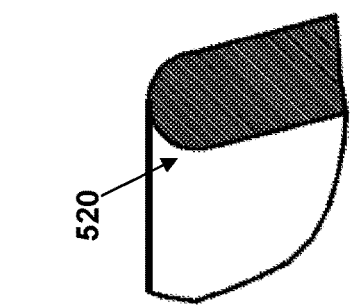
FIG. 10B
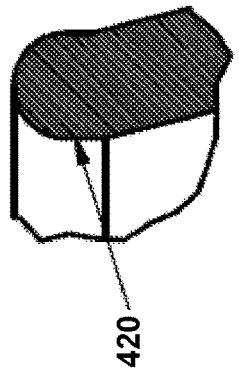
FIG. 11B
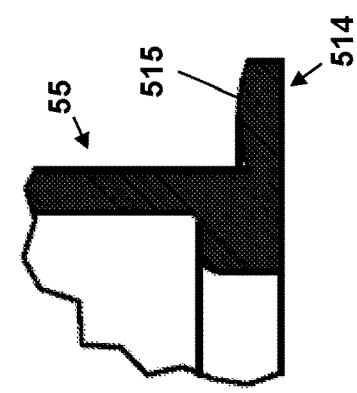
FIG. 10A
FIG. 11A
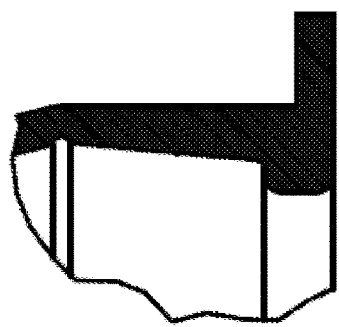
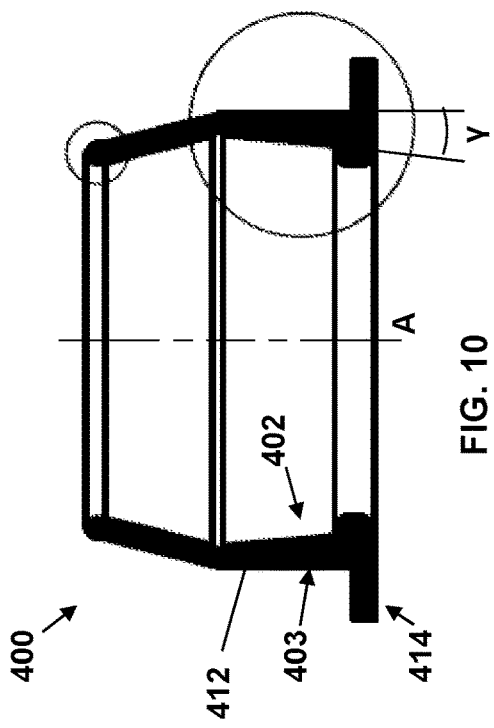
FIG. 10
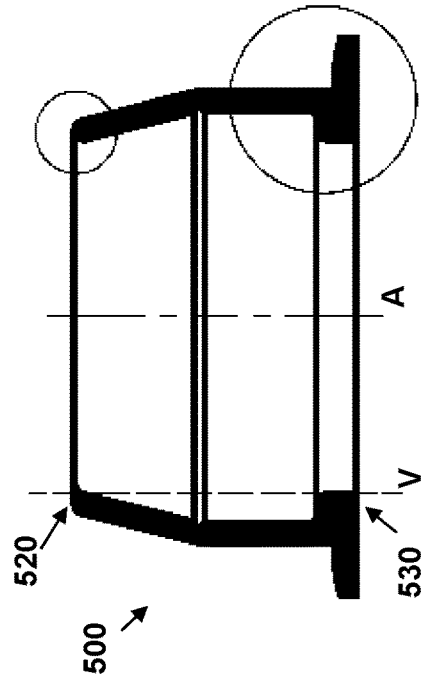
FIG. 11

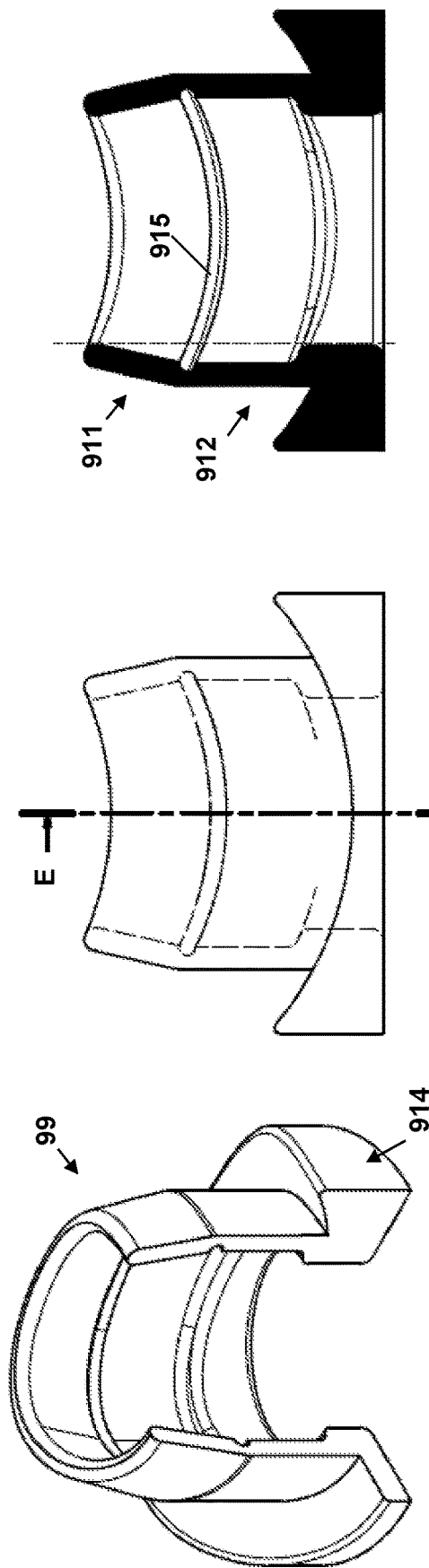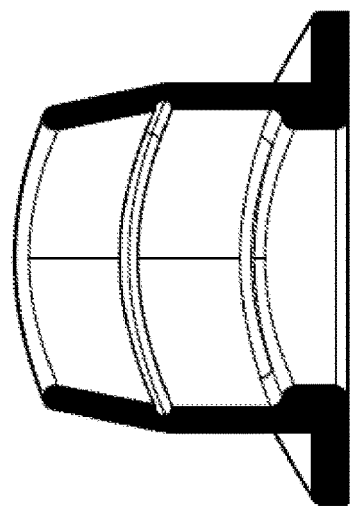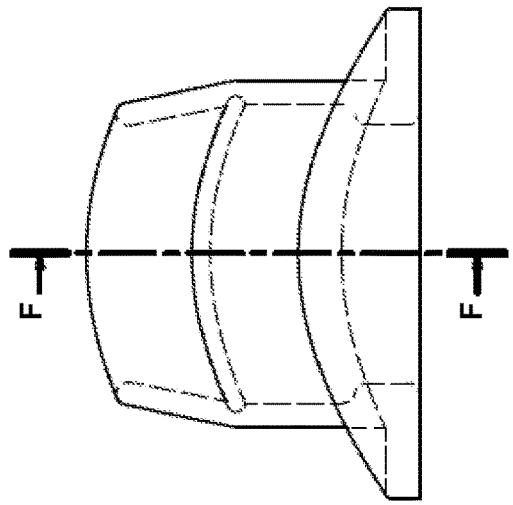

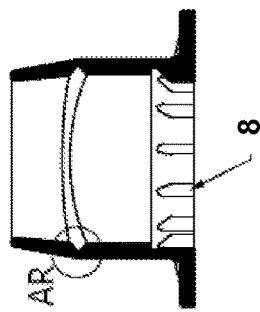
FIG 30A
FIG 32
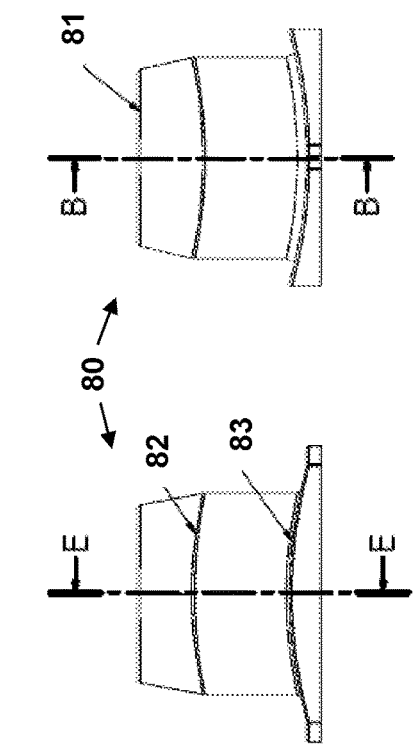
FIG 30
FIG 29
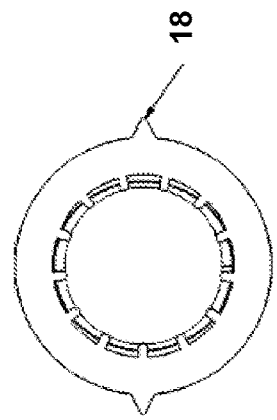
FIG 29B
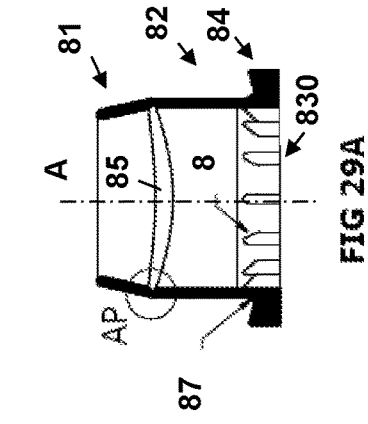
FIG 29A
FIG 31

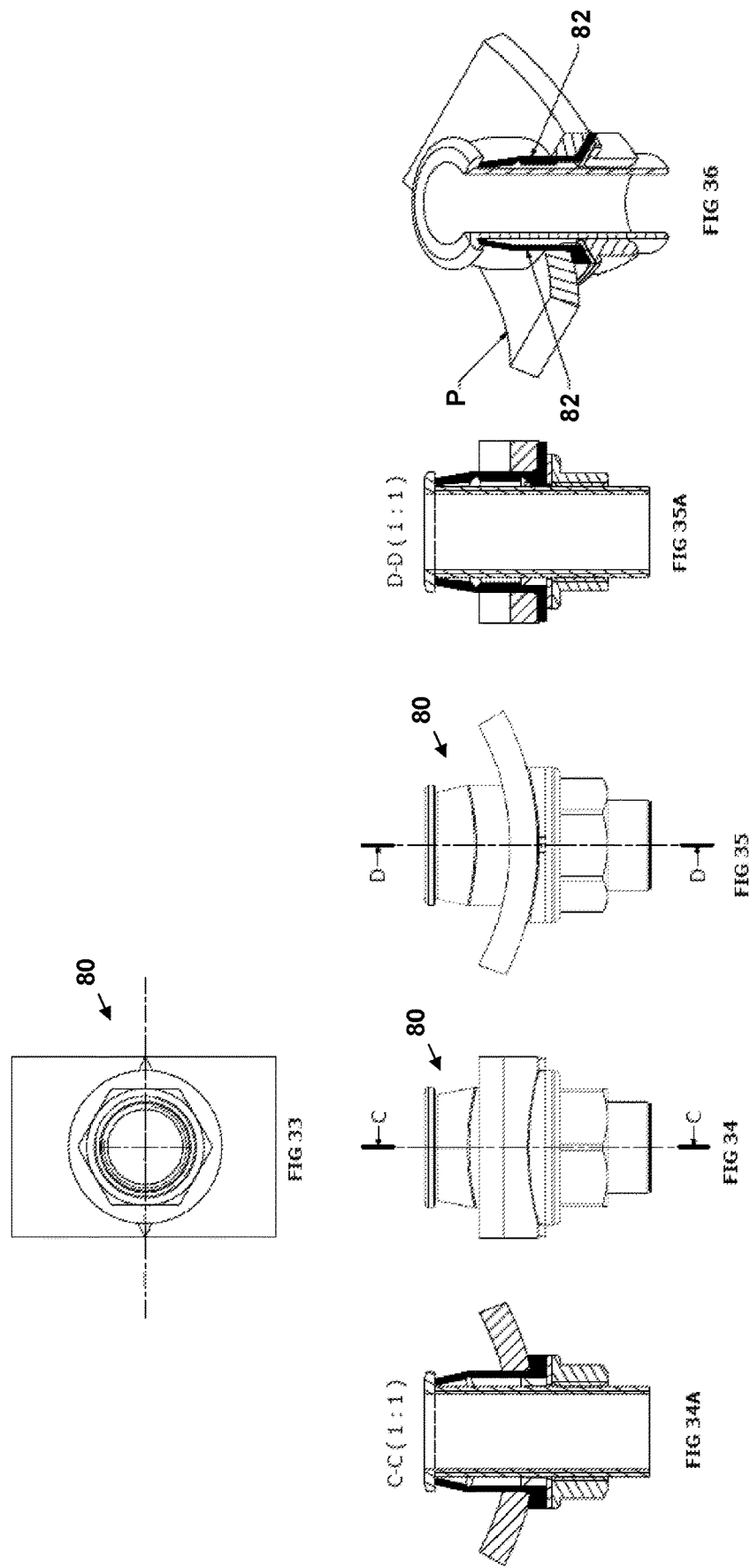

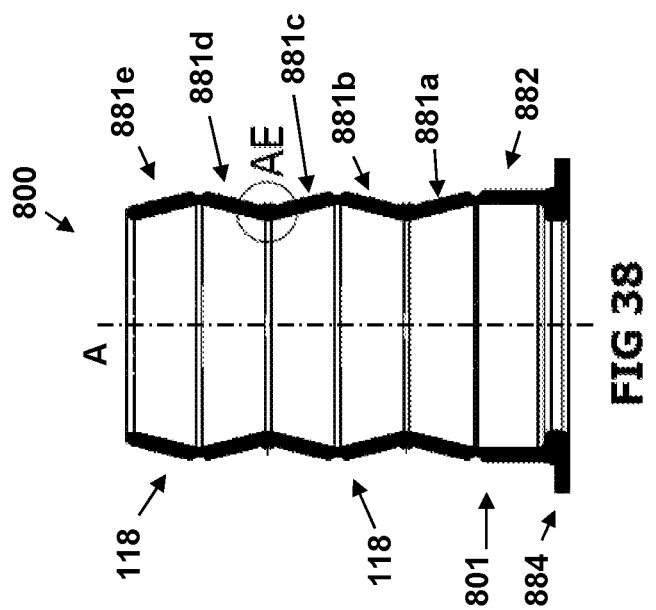
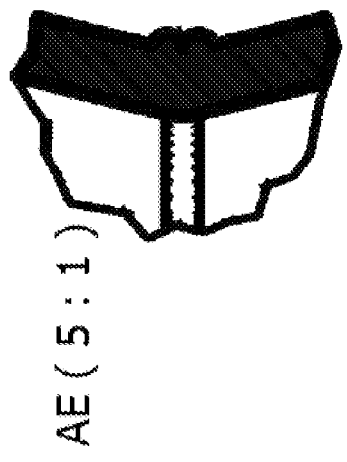
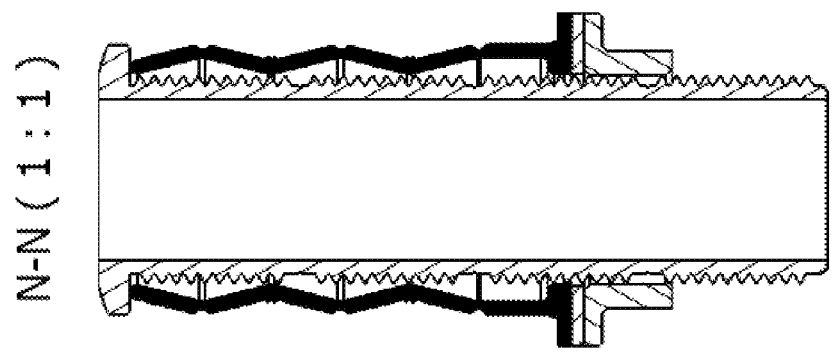
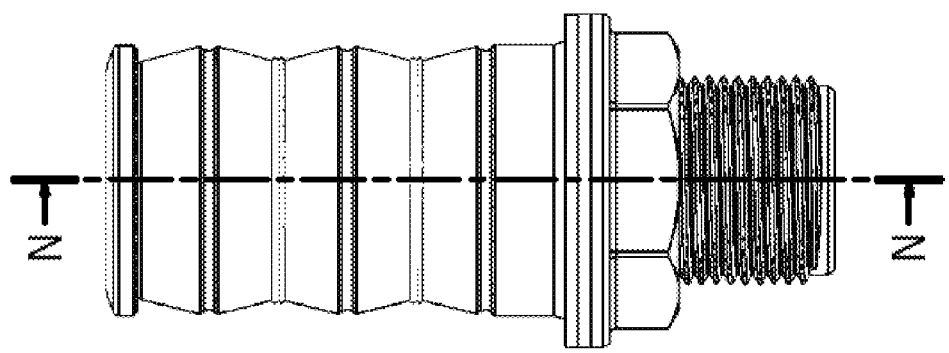

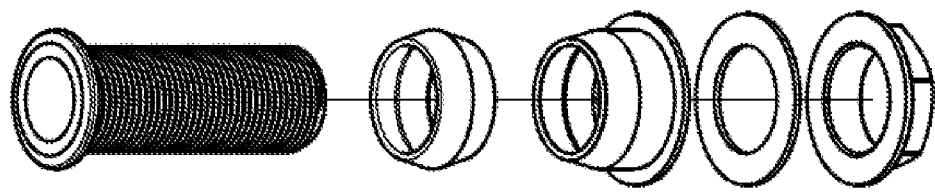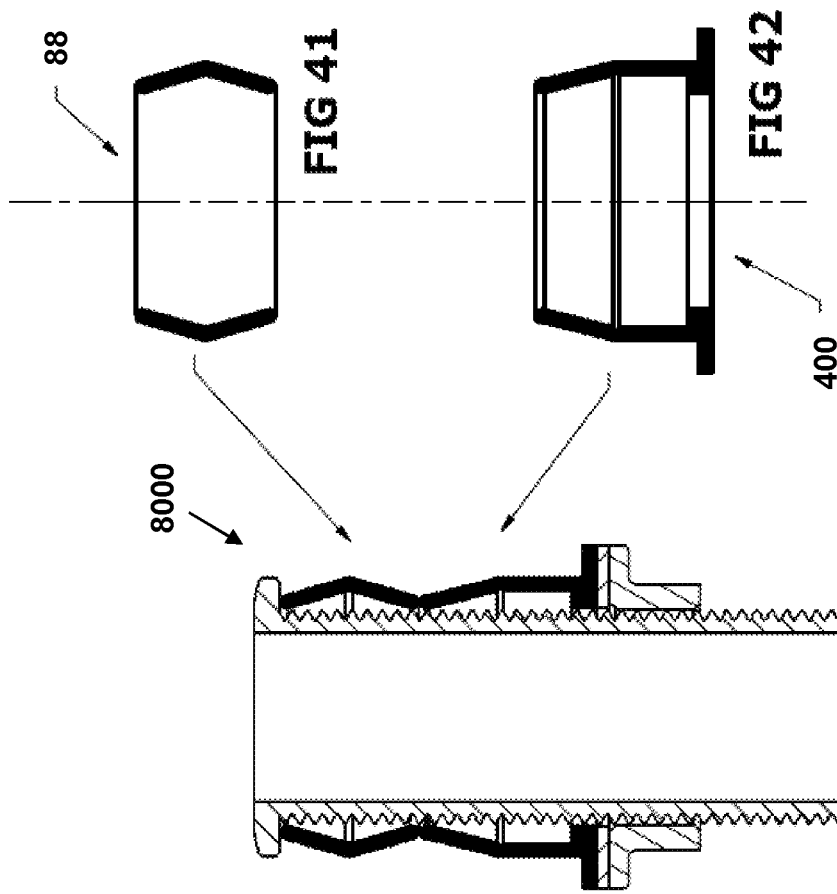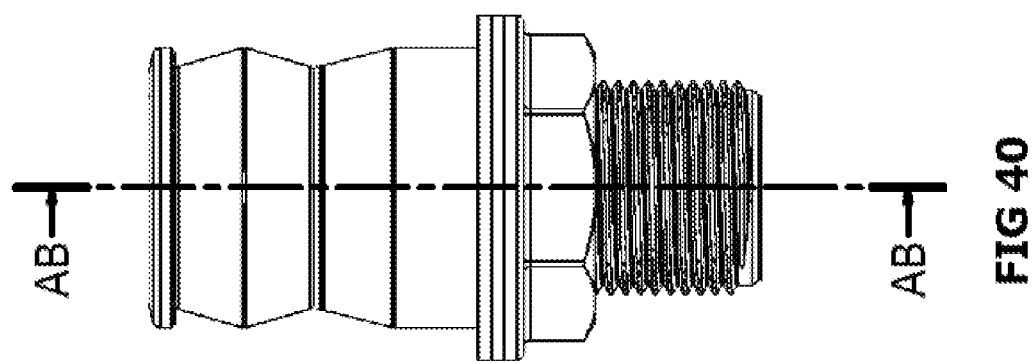

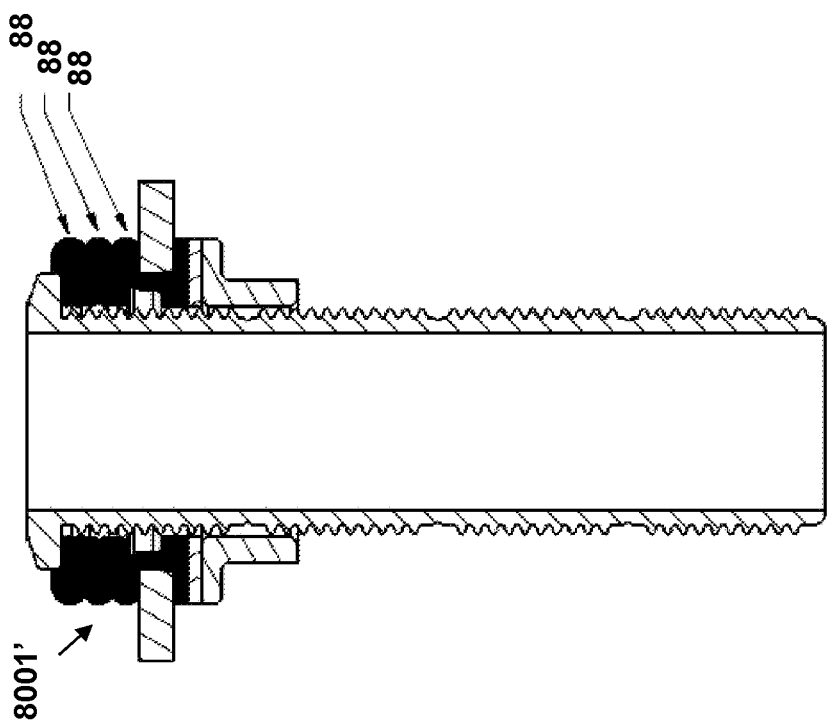
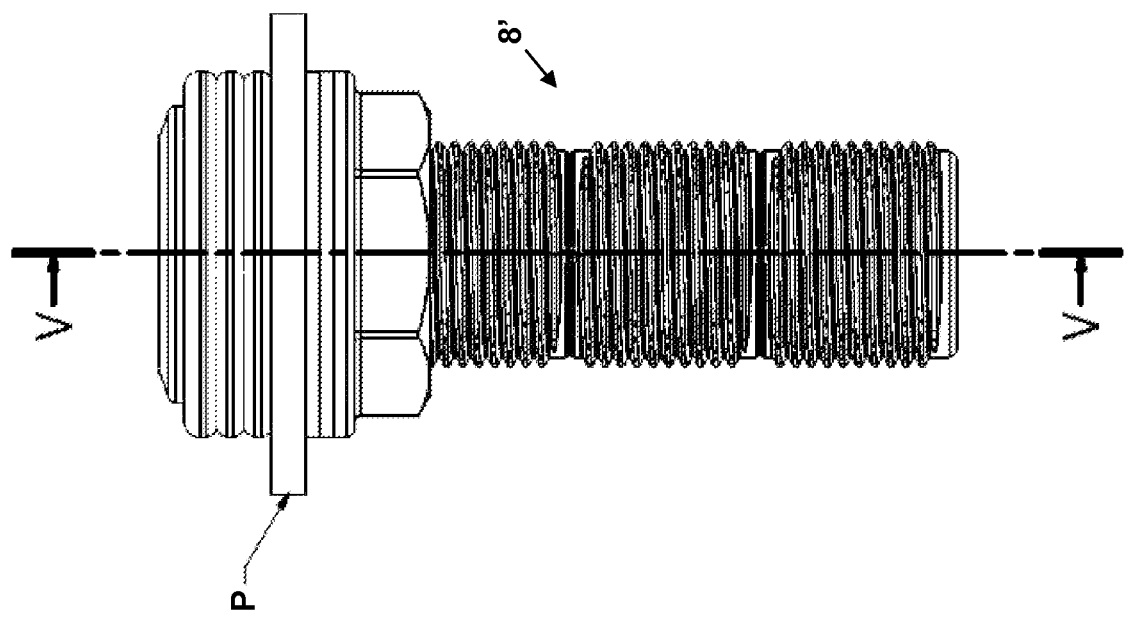

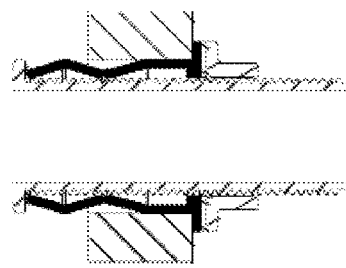
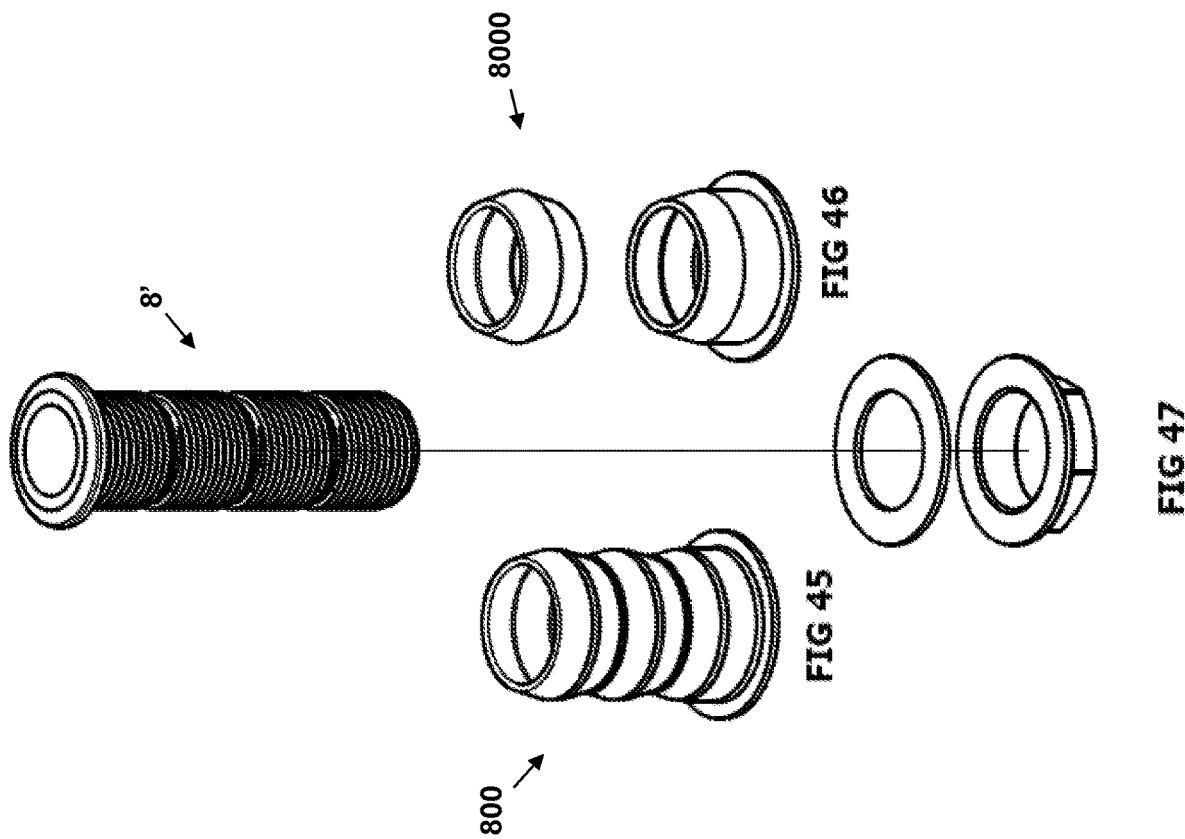
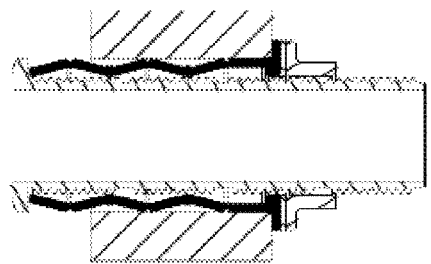

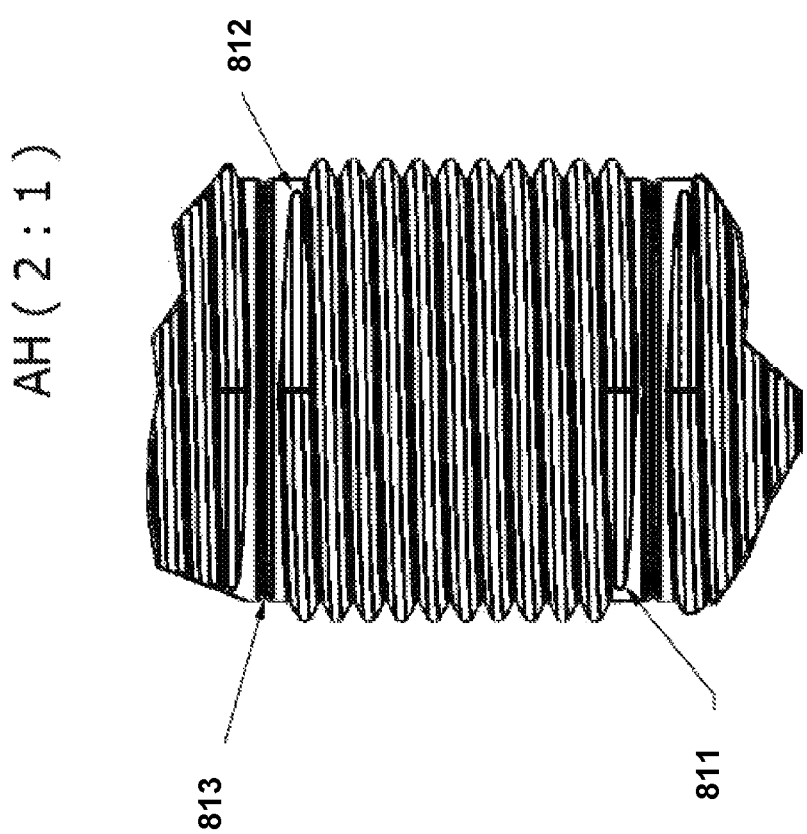
FIG 49
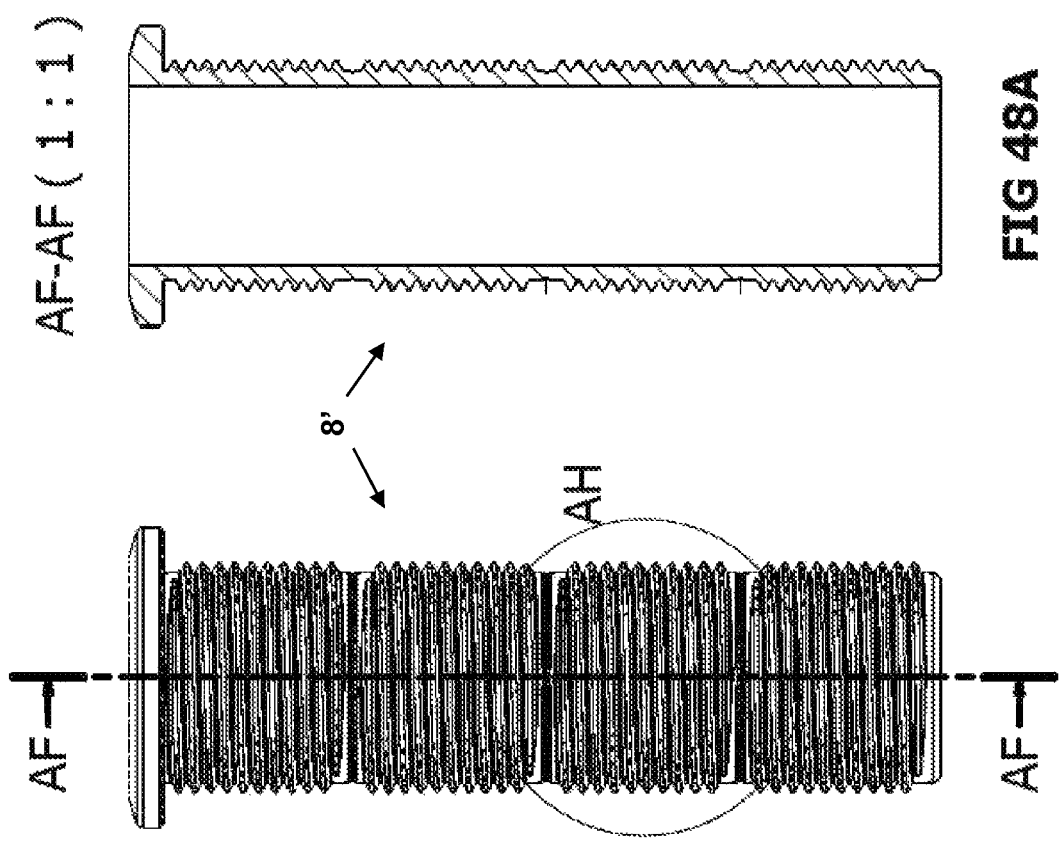
FIG 48A
FIG 48

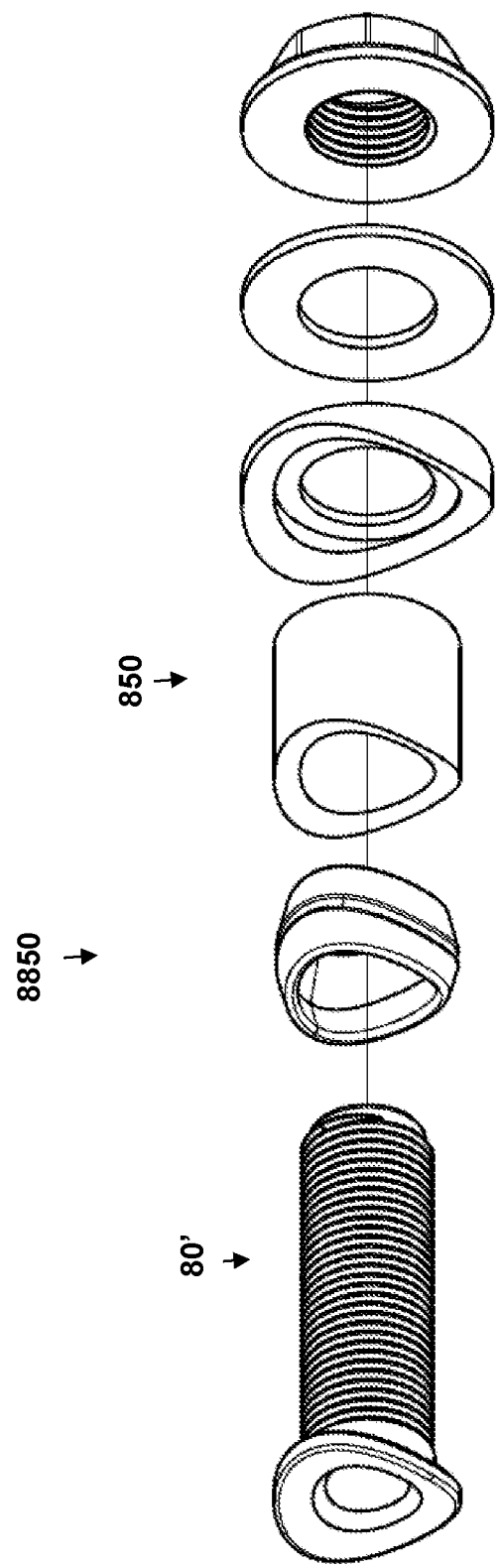

DEFORMABLE GASKET FOR THE SEALED PASSAGE OF A FLUID THROUGH A WALL

CROSS-REFERENCE TO RELATED APPLICATIONS

This application is a 371 of PCT/IB32017/056986, filed Nov. 8, 2017 which claims the benefit of Italian Patent Application No. 102016000113022, filed Nov. 9, 2016.

FIELD OF THE INVENTION

The present invention relates to a gasket to allow the sealed passage of a fluid through a wall.

BACKGROUND OF THE INVENTION

In the hydraulics field, there is often a need to place two environments separated by a wall in communication with one another so as to allow the sealed passage of a fluid through said wall. This is achieved for example when it is desired to connect the internal compartment of a tank to an external pipe.

The above-mentioned hydraulic communication is stabilized by forming an appropriate seat in the wall and by installing a connector assembly in said seat.

The connector assemblies used traditionally comprise a tubular connection element, commonly referred to as a "tank connector", having one or more externally threaded portions. The aforementioned assemblies also comprise two ring nuts for locking the tank connector from opposite sides of the wall. This locking involves the interpositioning of an annular gasket between each ring nut and the wall.

In order to install a connector assembly of this kind, it is necessary to firstly insert the tank connector through the connection seat. To this end, the connection seat has a passage opening of transverse dimensions equal to or slightly greater than those of the tank connector itself, but smaller than the transverse dimensions of the two ring nuts. Thus, each ring nut is screwed to the tank connector until the relative gasket is clamped against the corresponding face of the wall.

The above-described connector assemblies from the prior art have some significant disadvantages. The primary disadvantage lies in the fact that the procedure for installing the assembly requires the two ring nuts and the relative gaskets to be inserted on the tank connector from opposite sides of the wall. Thus, such installation generally requires two workers, each handling one ring nut. In addition, in the case of installation of the assembly on a tank, the above-mentioned technique requires a worker to bring their arm inside the tank itself in order to install the internal ring nut. However, this is often very difficult insofar as the tanks frequently have an entry mouthpiece of reduced dimensions and are of a significant height.

Document EP 1 301 739 describes a deformable gasket for overcoming the above-mentioned disadvantages.

A further difficulty generally encountered with the known connector assemblies and gaskets is that of correctly centering the gasket or gaskets on the cylindrical body of the connector, particularly when such gaskets have a complex form.

Yet a further disadvantage associated with the known deformable gaskets is that they do not guarantee a correct and foreseeable deformation of the gasket under various working conditions, particularly when the gasket itself has a complex form.

SUMMARY OF THE INVENTION

The technical problem forming the basis of the present invention is therefore that of providing a gasket that makes it possible to improve the performance of the gaskets known from the prior art in respect of the above-mentioned disadvantages.

This problem is solved by a gasket according to claim 1.

Preferred features of the invention are provided in the accompanying dependent claims.

The present invention provides a number of significant advantages. The main advantage lies in the fact that the gasket, thanks to the presence of a centering portion, can be installed in a simple, quick and precise manner on the associated connector assembly, and in particular on the cylindrical body thereof, and is thus effective from just one side of the wall. The gasket of the invention thus makes it possible to obtain an optimal ratio between the quality of the installation and the time and cost requirements thereof.

According to a preferred aspect of the invention, at least the internal and external walls of the deformable region of the gasket have inclined profiles. In other words, the gasket has a variable section, which forms a "guide" for the deformation of the gasket in the sense of promoting a repeatable and reliable folding over of a first gasket portion on a second gasket portion, as will be better understood with reference to the detailed description of preferred embodiments provided hereinafter. In particular, the thickness of the gasket decreases progressively along an axis of longitudinal development of the gasket, proceeding towards the terminal end of the gasket inserted in the wall to be connected.

Inclined profiles of this kind can be understood to be suitable for being formed in combination with any embodiment of the gasket according to the present invention, as described hereinafter.

Further advantages, features and applications of the present invention will become clear from the following detailed description of a number of embodiments of the invention, presented by way of non-limiting example.

BRIEF DESCRIPTION OF THE DRAWINGS

In the following description, reference will be made to the Figures of the accompanying drawings, in which:

FIG. 7 shows a side view of a gasket in accordance with a further preferred embodiment of the present invention, with the internal profiles (not visible) shown by dashed lines;

FIG. 7A shows a longitudinal sectional view of the gasket of FIG. 7, taken along the line A-A of the latter figure;

FIGS. 9A, 9B and 9C each show a semi-sectional side view of the assembly of FIG. 8, respectively in a configuration for insertion through a wall, in a configuration inserted through the wall, and in a configuration completely installed with deformed gasket;

FIGS. 10 and 11 show, respectively, a longitudinal sectional view of other embodiments of a gasket according to the present invention;

Figure 13A:
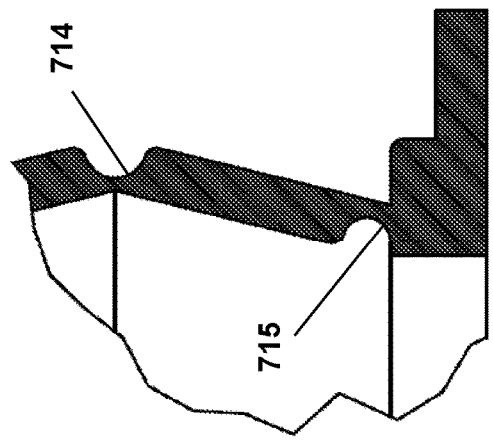
Figure 12A:
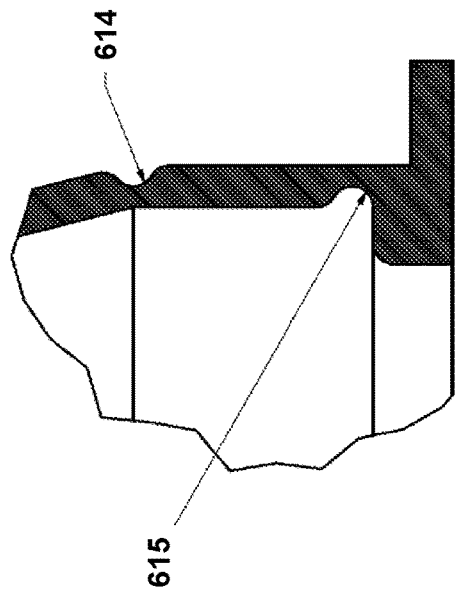
Figure 12:
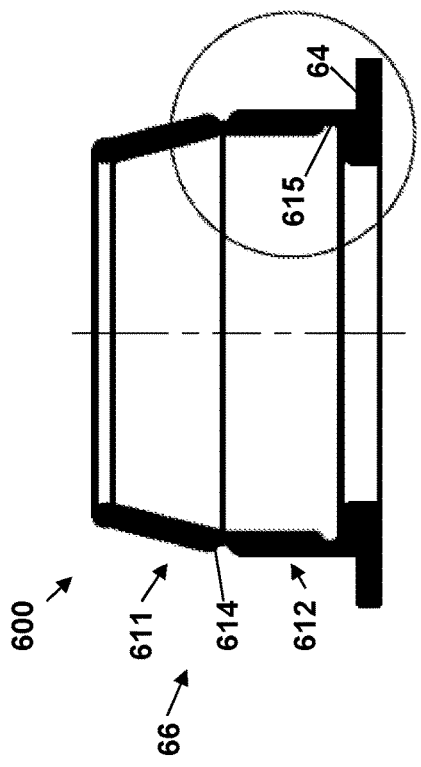
Figure 13:
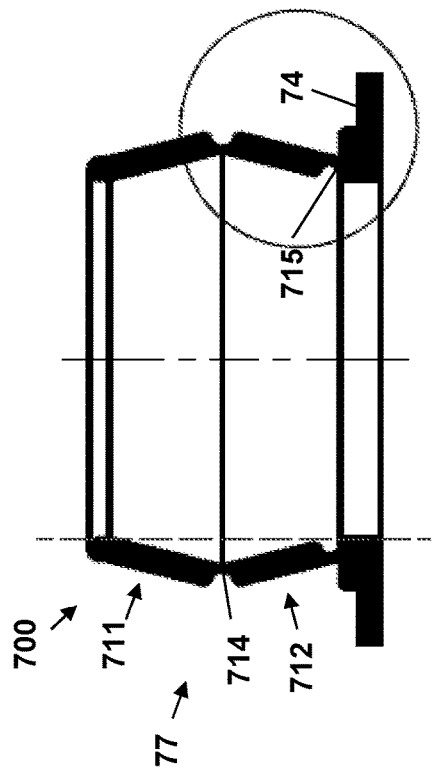
Figure 14A:
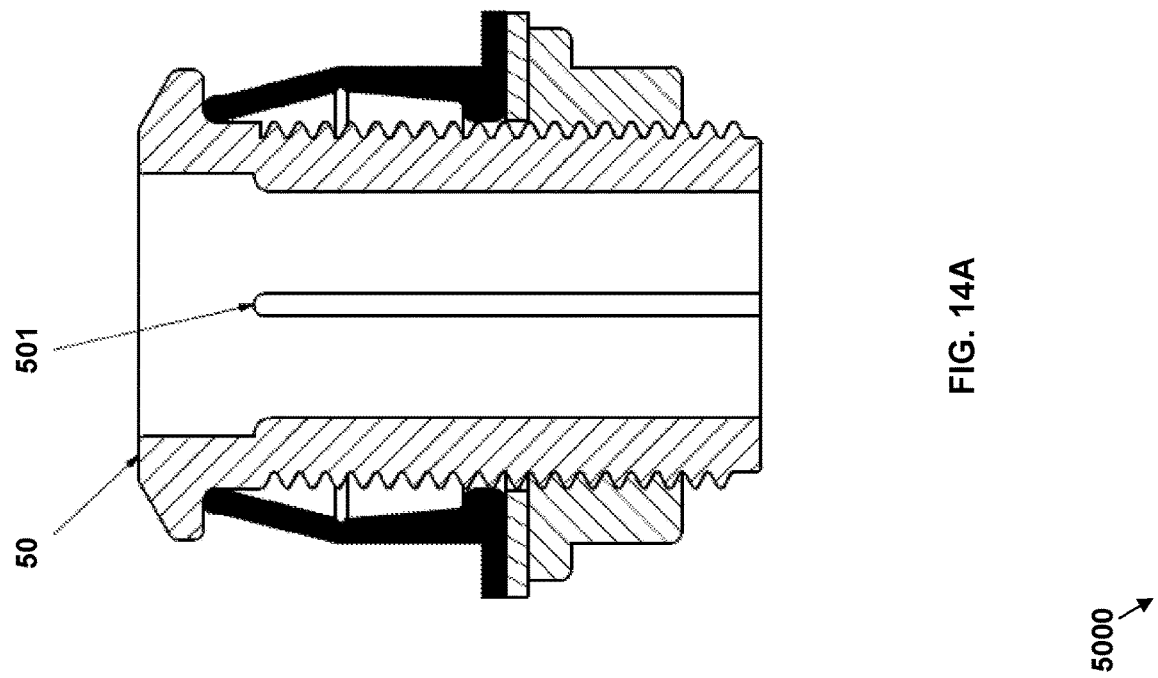
Figure 14:
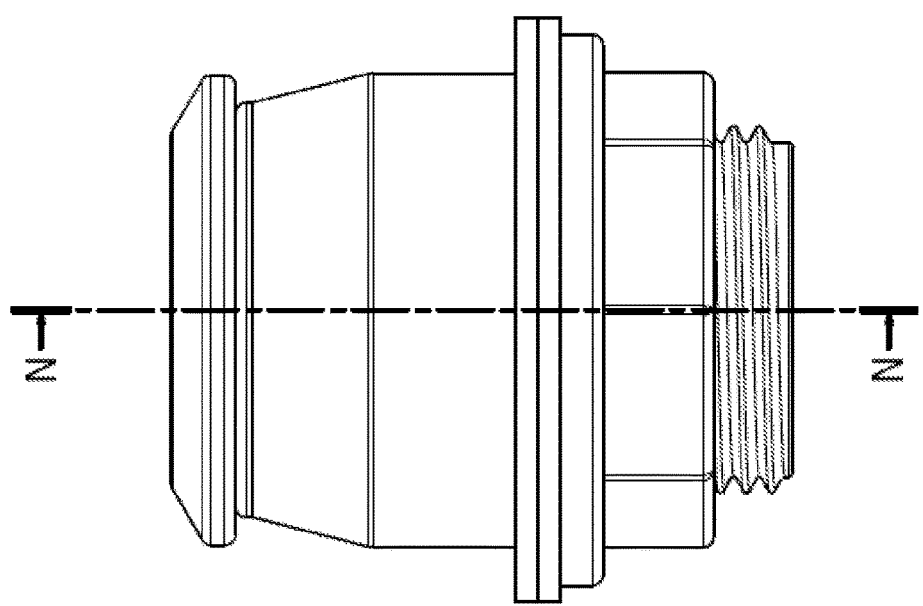
Figure 15A:
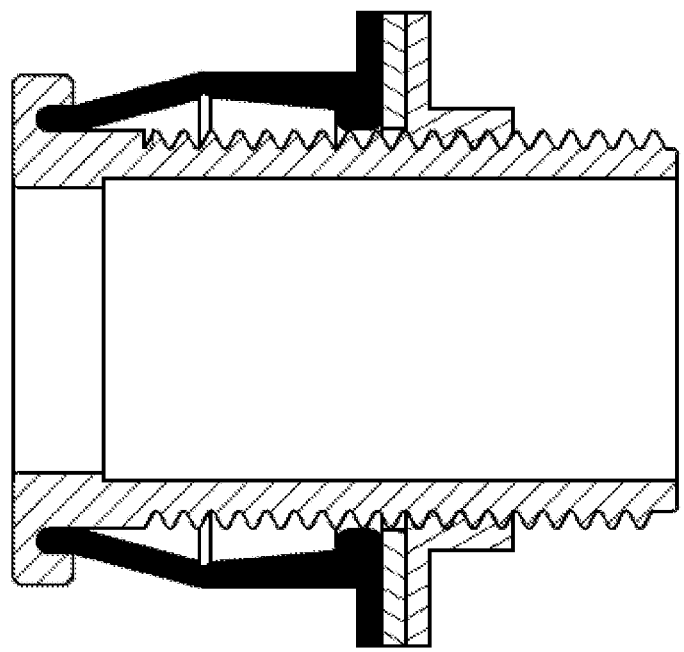
Figure 15:
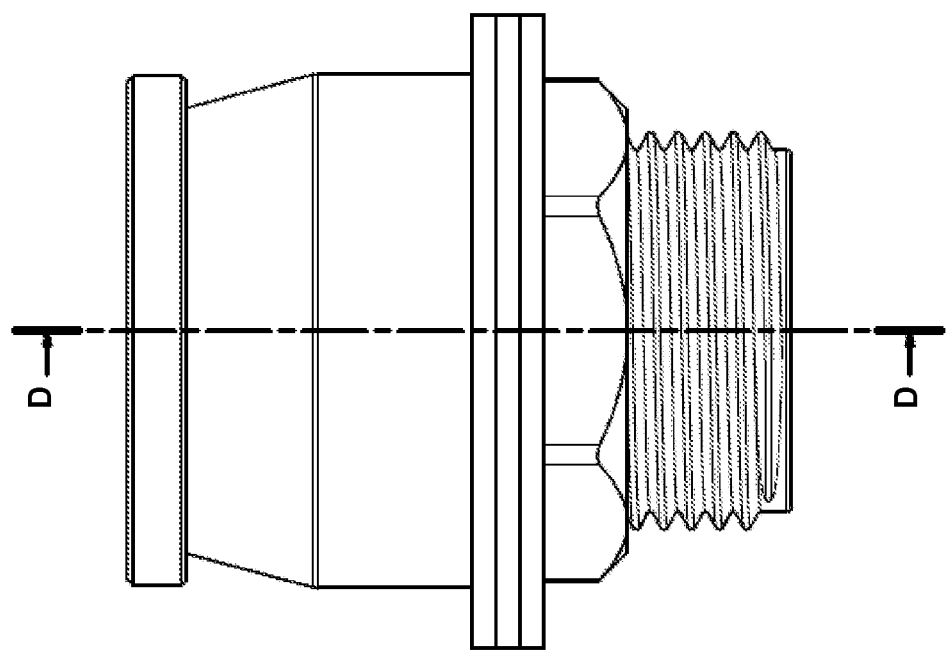
Figure 17:
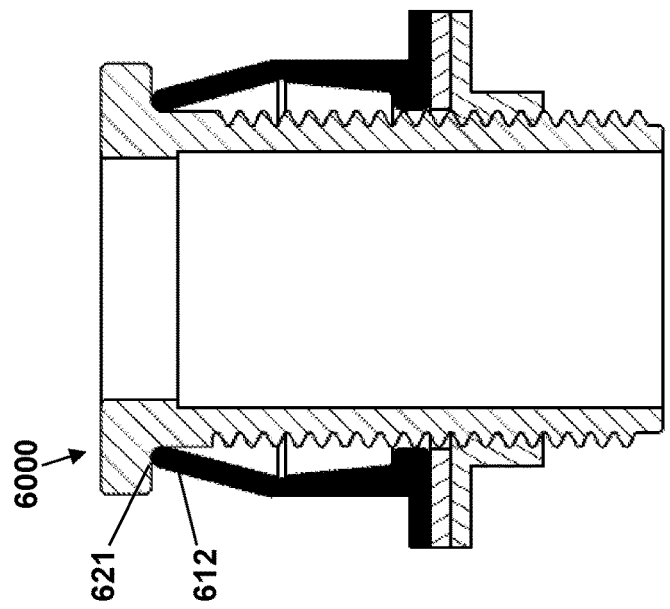
Figure 18:
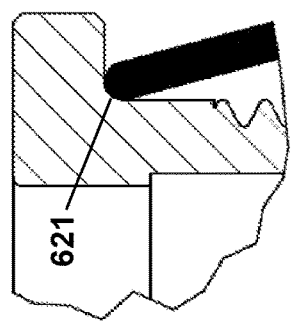
Figure 16:
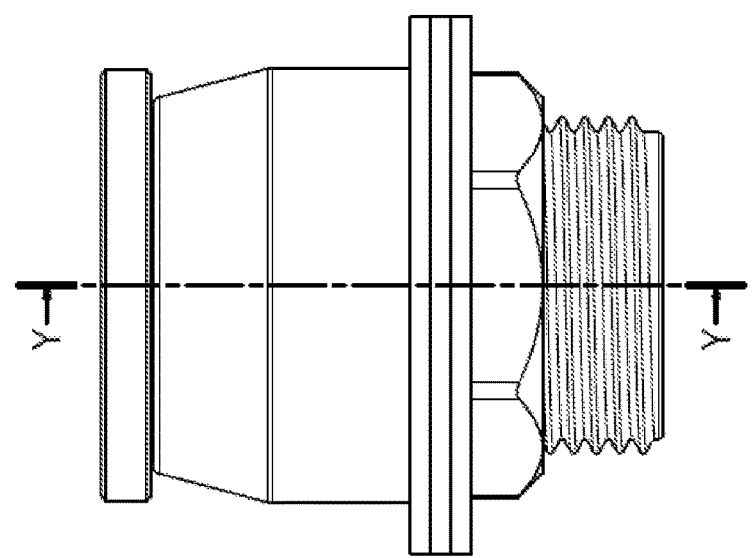
Figure 21A:
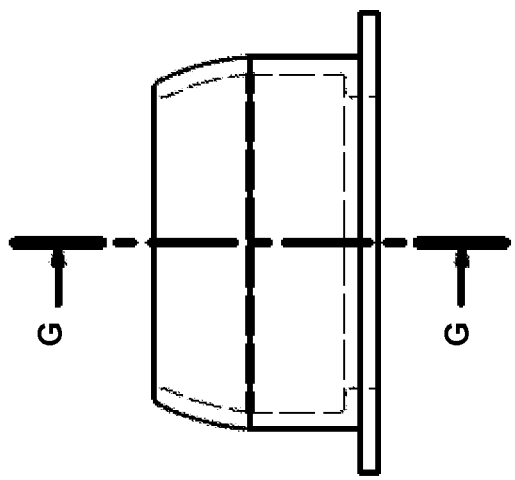
Figure 22:
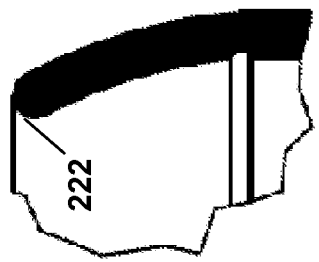
Figure 21:
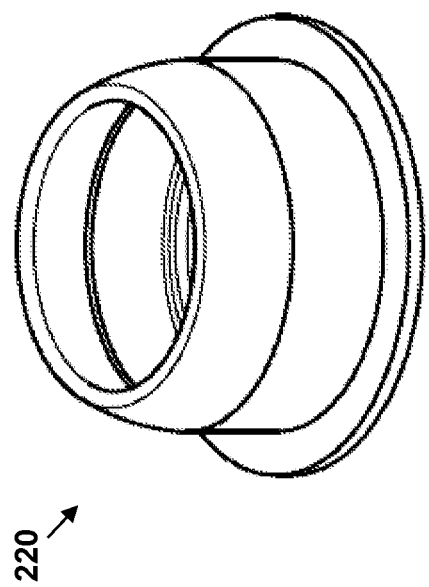
Figure 21B:
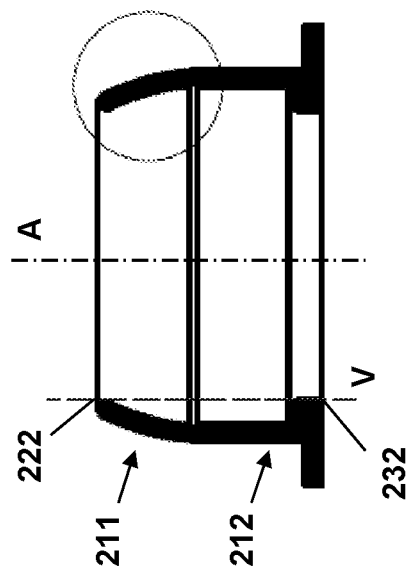
Figure 24A:
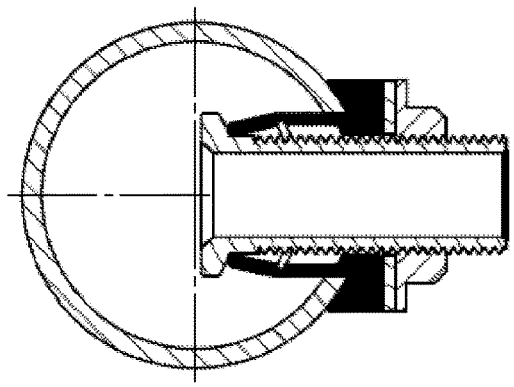
Figure 24:
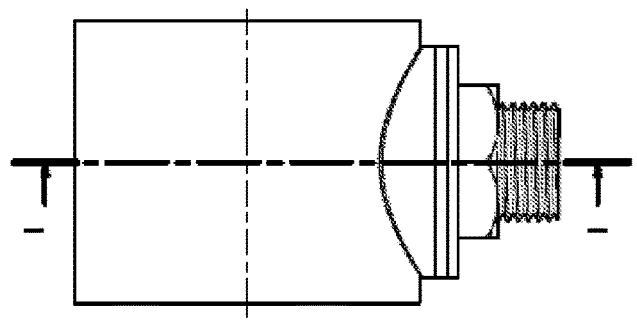
Figure 23A:
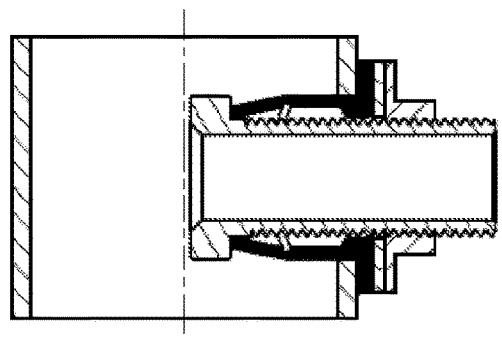
Figure 23:
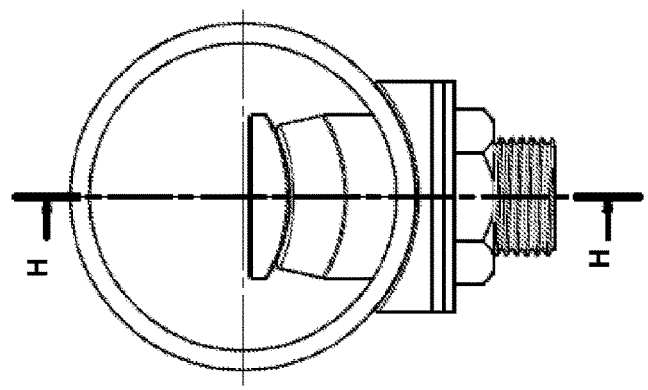
Figure 25:
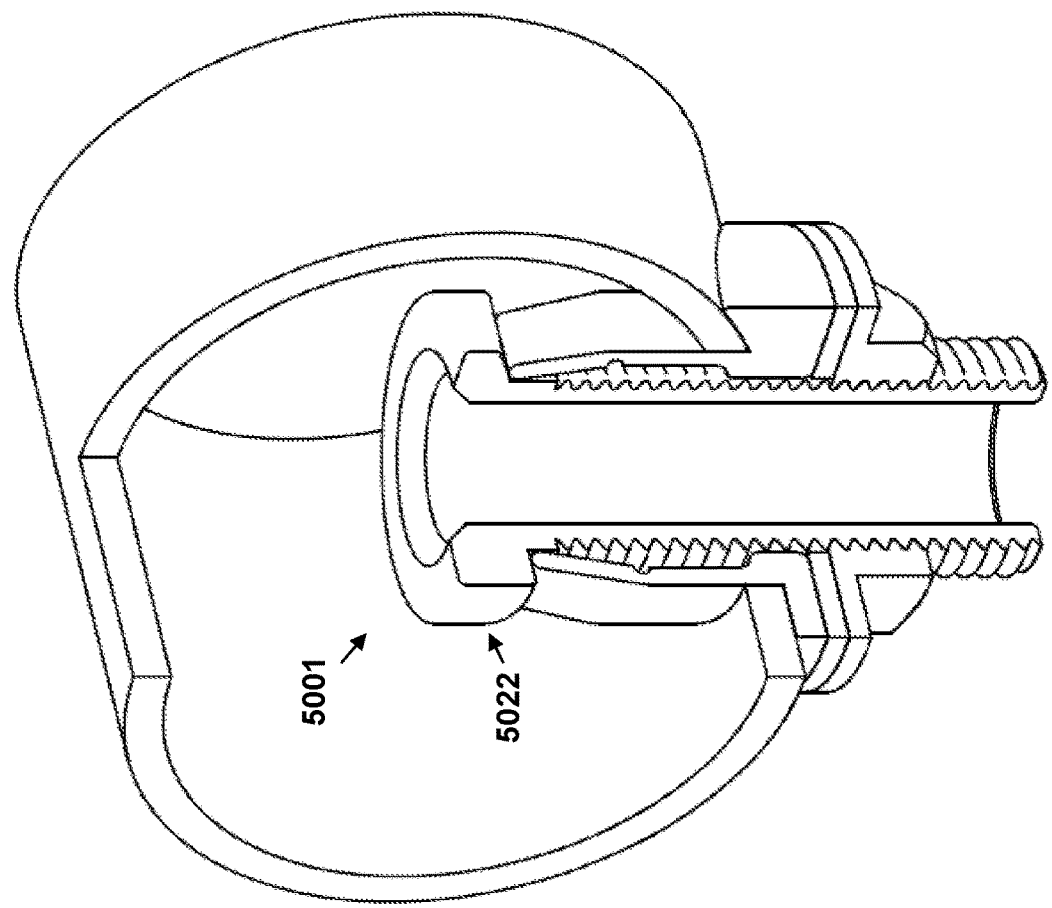
Figure 27A:
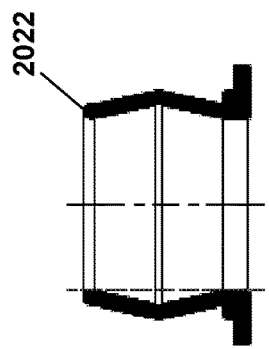
Figure 27:
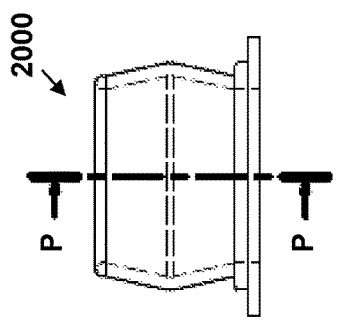
Figure 28A:
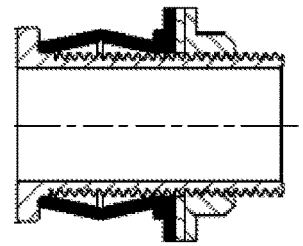
Figure 26A:
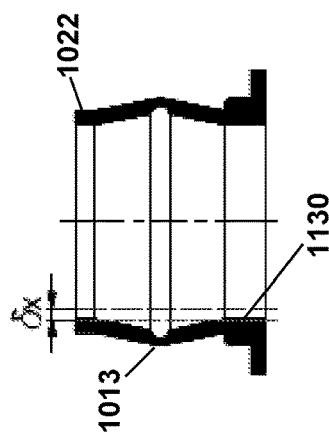
Figure 28:
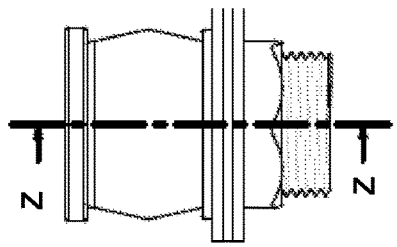
Figure 26:
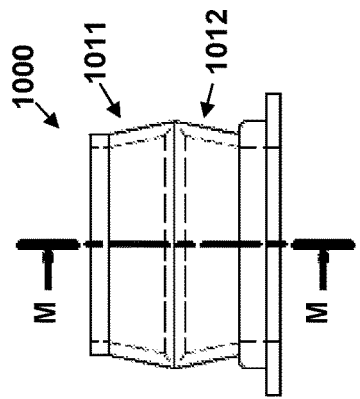
Figure 51A:
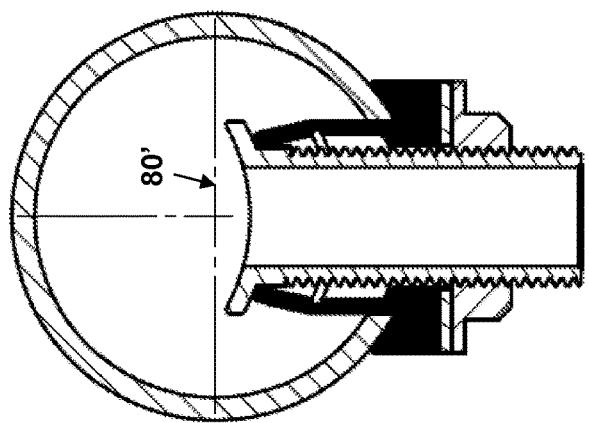
Figure 51:
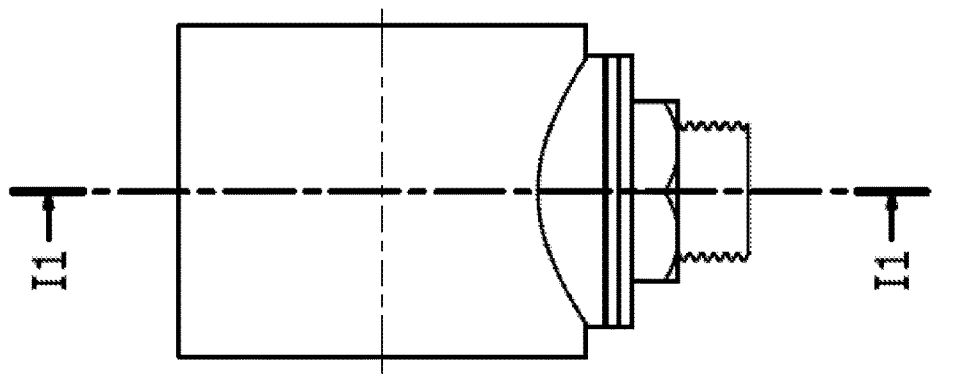
Figure 50A:
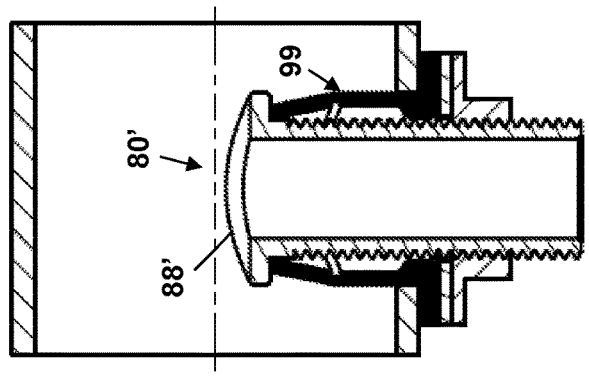
Figure 50:
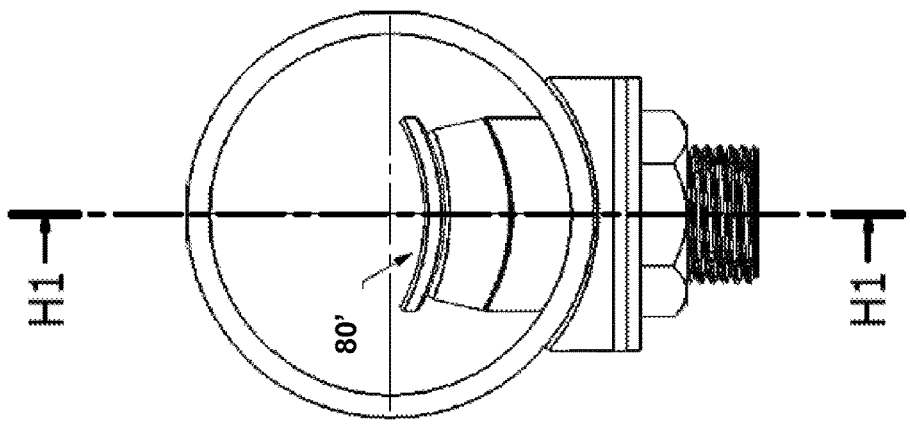
Figure 53A:
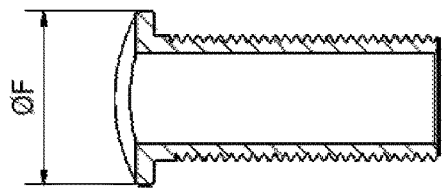
Figure 53:
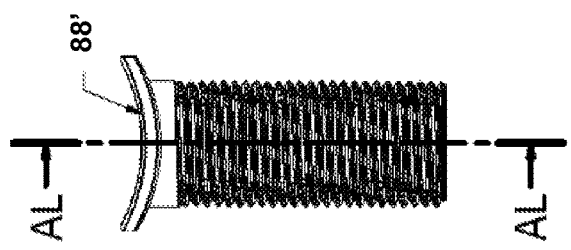
Figure 52:
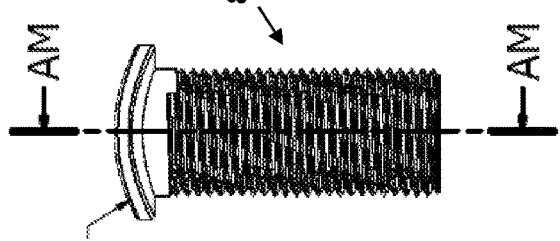
Figure 52A:
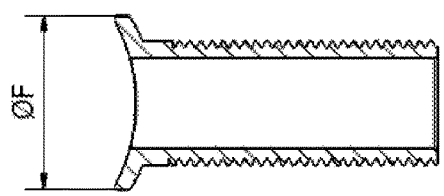
Figure 54A:
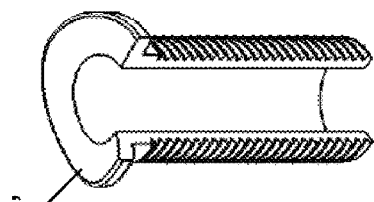
Figure 54:
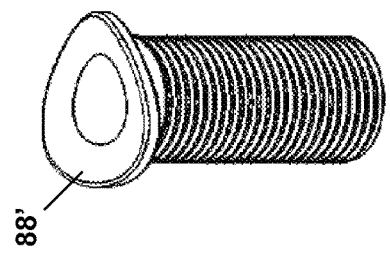
Figure 55:
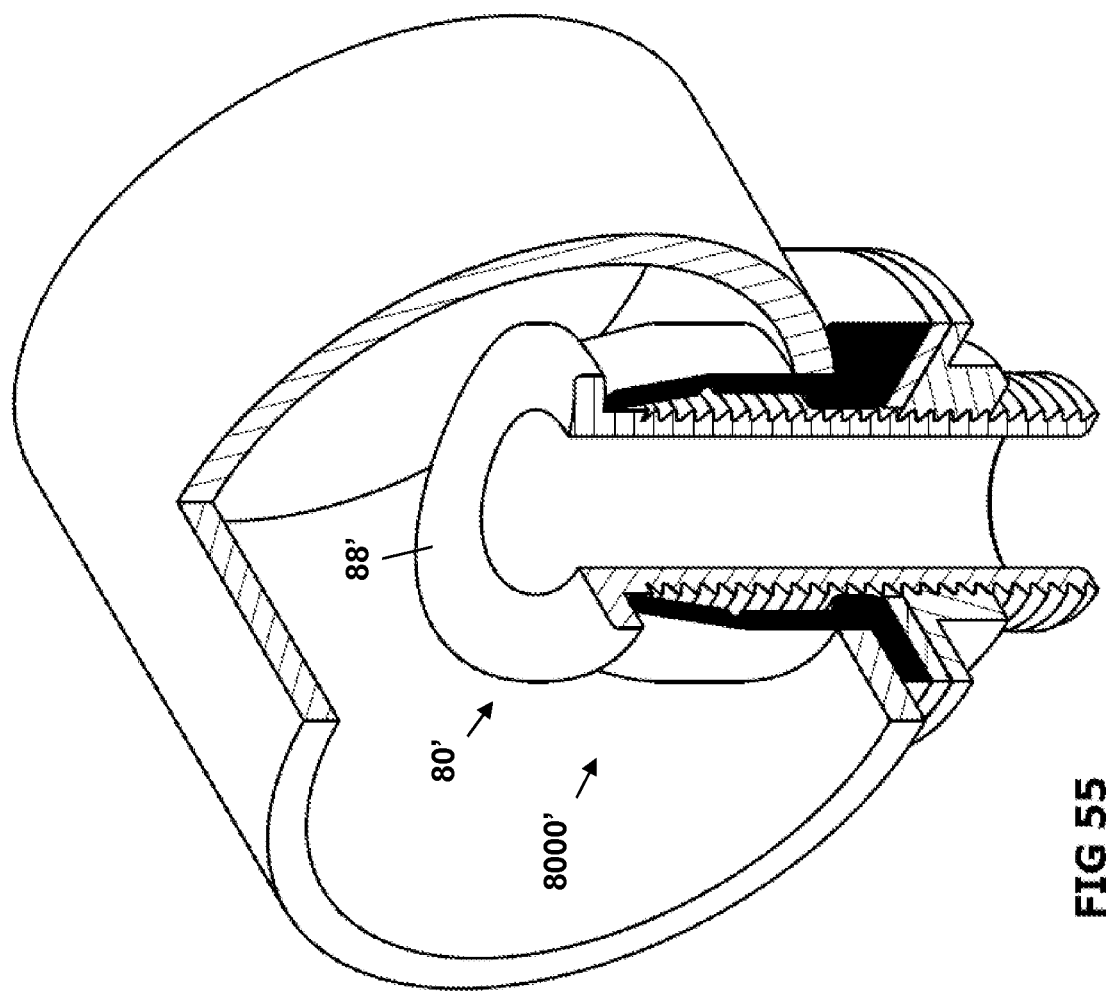
Figure 56:
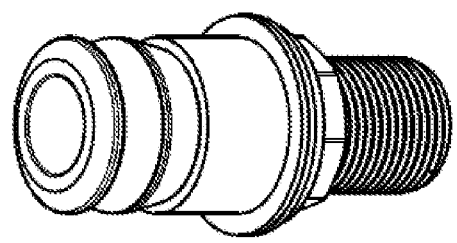
Figure 57:
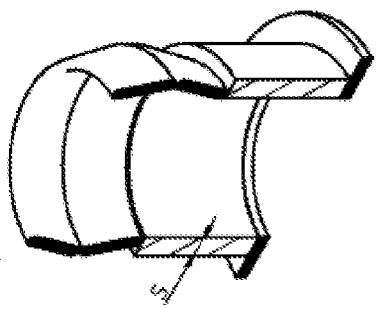
Figure 56A:
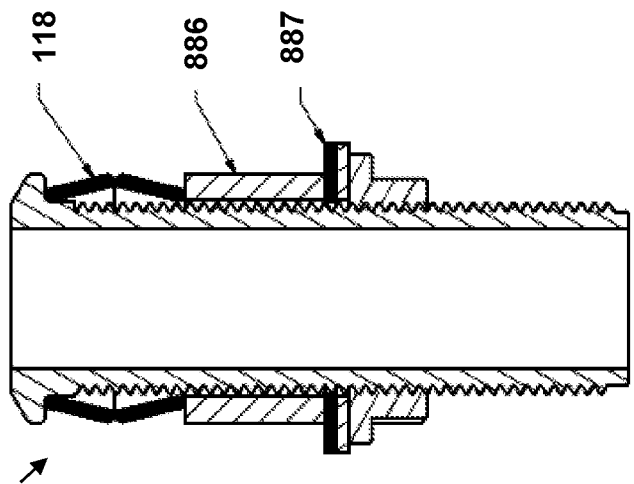
Figure 56:
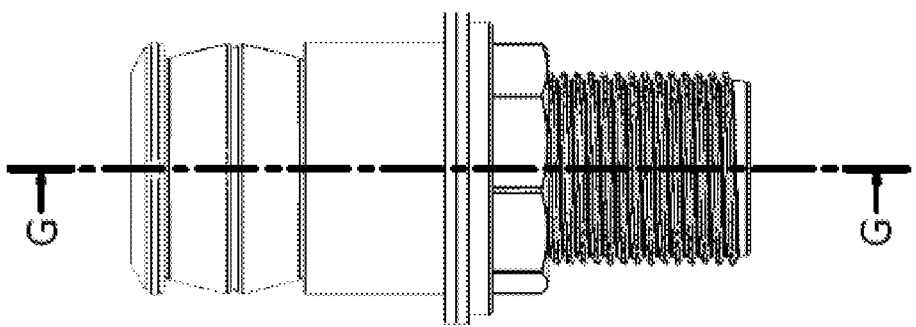
Figure 61:
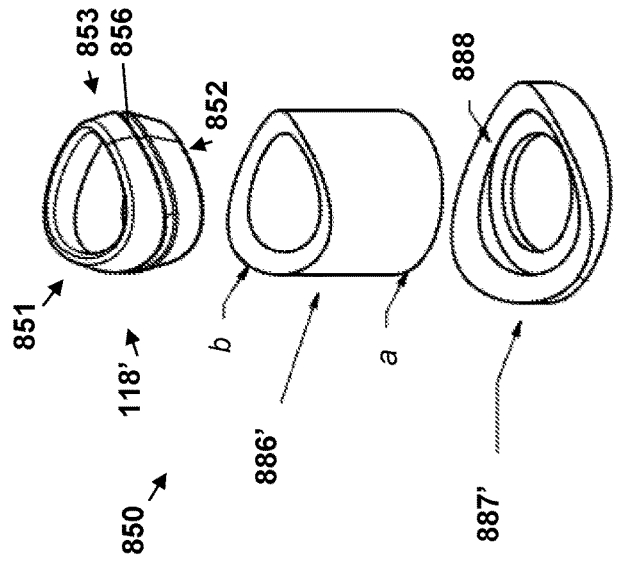
Figure 59:
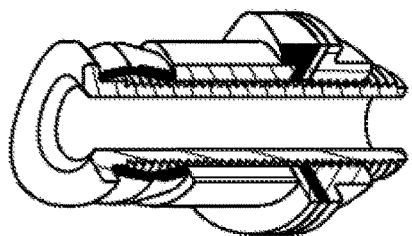
Figure 58:
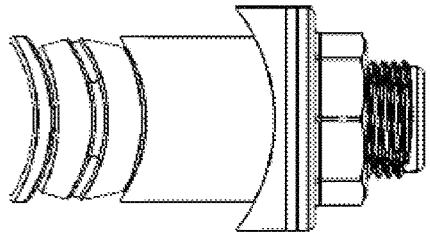
Figure 60:
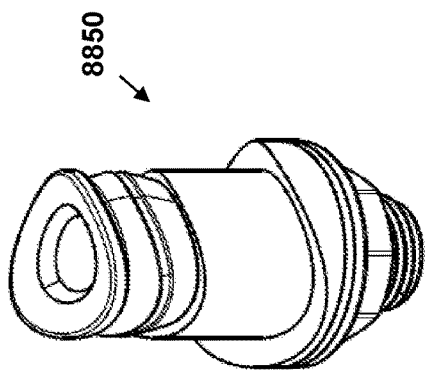

the pairs of FIGS. 10A, 10B and 11A, 11B each show enlarged details respectively of the embodiment of the gasket shown in FIG. 10 and of the embodiment of the gasket shown in FIG. 11;

FIGS. 12 and 13 show, respectively, a longitudinal sectional view of further embodiments of a gasket according to the present invention;

FIGS. 12A and 13A each show an enlarged detail respectively of the embodiment of the gasket shown in FIG. 12 and of the embodiment of the gasket shown in FIG. 13;

FIGS. 14 and 14A show, respectively, a side view and a longitudinal sectional view of a preferred embodiment of a connector assembly comprising the gasket of FIG. 10;

FIGS. 15 and 15A show, respectively, a side view and a longitudinal sectional view of a further preferred embodiment of a connector assembly comprising the gasket of FIG. 10;

FIGS. 16, 17 and 18 show, respectively, a side view, a longitudinal sectional view, and an enlarged detail of the coupling between the gasket and the gasket seat of the tubular element of a further preferred embodiment of a connector assembly comprising the gasket of FIG. 10;

FIG. 19 shows a perspective view, partially in section, of a further preferred embodiment of the gasket according to the present invention;

the pairs of FIGS. 20A, 20B and 20C, 20D show, respectively, a side view of the embodiment of the gasket of FIG. 19 and a relative sectional view along the planes of section indicated in each of FIGS. 20A and 20C;

FIGS. 21, 21A and 21B show, respectively, a perspective view, a side view, and a longitudinal sectional view of yet a further preferred embodiment of a gasket according to the present invention;

FIG. 22 shows an enlarged detail of FIG. 21B;

the couples of FIGS. 23, 23A and 24, 24A show, respectively, a side view and a corresponding longitudinal sectional view of a further preferred embodiment of a connector assembly according to the present invention in a configuration inserted through the wall of a pipe;

FIG. 25 shows a perspective view, partially in section, of the embodiment of the connector assembly shown in preceding FIGS. 23 to 24A;

the couples of FIGS. 26, 26A and 27, 27A show, respectively, a side view and a corresponding longitudinal sectional view of yet further preferred embodiments of a gasket according to the present invention;

FIGS. 28 and 28A show, respectively, a side view and a corresponding longitudinal sectional view of yet further preferred embodiments of a connector assembly according to the present invention, in which embodiments of the gaskets shown in preceding FIGS. 26 and 27 are presented, respectively;

FIGS. 29 and 30 show, respectively, a side view from the right and a side view from the left of yet a further embodiment of a gasket according to the present invention;

FIGS. 29A and 30A show, respectively, a longitudinal sectional view of the gasket shown in FIGS. 29 and 30;

FIG. 29B shows a plan view of the embodiment of FIGS. 29 and 30;

FIGS. 31 and 32 show an enlargement respectively of details of FIGS. 29A and 30A;

FIGS. 34 and 35 show, respectively, a side view from the right and a side view from the left of yet a further embodiment of a connector assembly according to the present invention, installed in a curved wall;

FIGS. 34A and 35A show, respectively, a longitudinal sectional view from the right and left of the assembly shown in FIGS. 34 and 35;

FIG. 33 shows a plan view of the embodiment of FIGS. 34 and 35;

FIG. 36 shows a perspective view, partially in section, of the embodiment of FIGS. 34 and 35;

FIGS. 37 and 37A show, respectively, a side view and a longitudinal sectional view of a first preferred embodiment of a connector assembly comprising a modular gasket according to the present invention;

FIG. 38 shows a longitudinal sectional view of the embodiment of FIG. 37;

FIG. 39 shows an enlargement of a detail of FIG. 38;

FIG. 40 shows a side view of a further preferred embodiment of a modular gasket according to the present invention in an installation configuration;

FIG. 40A shows a longitudinal sectional view of the embodiment of FIG. 40;

FIGS. 41 and 42 show, respectively, a longitudinal sectional view of components comprised in the gasket according to the embodiment of FIG. 40;

FIG. 43 shows an exploded view of the embodiment shown in FIG. 40;

FIGS. 44 and 44A show, respectively, a side view and a longitudinal sectional view of the embodiment shown in FIG. 40, in a tightened configuration of the gasket;

FIG. 45 shows a perspective view of the gasket of FIG. 37;

FIGS. 45A and 47 show, respectively, a longitudinal sectional view in an installation configuration and a perspective exploded view of the embodiment of FIG. 37;

FIGS. 46 and 46A show, respectively, a perspective exploded view and a longitudinal sectional view in an installation configuration of the embodiment of FIG. 40;

FIGS. 48 and 48A show, respectively, a side view and a longitudinal sectional view of a preferred embodiment of a tubular element according to the present invention;

FIG. 49 shows an enlargement of a detail of FIG. 48;

FIGS. 50 and 50A show, respectively, a side view from the right and a corresponding longitudinal sectional view of a preferred embodiment of a connector assembly according to the present invention in an installation configuration;

FIGS. 51 and 51A show, respectively, a side view from the left and a corresponding longitudinal sectional view of a preferred embodiment of a connector assembly according to the present invention in an installation configuration;

the couples of FIGS. 52 and 52A, 53 and 53A show, respectively, a side view from the right and left and a corresponding longitudinal sectional view of a preferred embodiment of a tubular element according to the present invention, comprised in the connector assembly of FIGS. 50 and 51;

FIGS. 54 and 54A show, respectively, a perspective view and a longitudinal sectional view of a tubular element comprised in accordance with the embodiment of FIGS. 52 and 53;

FIG. 55 shows a perspective and partially sectional view of the connector assembly shown in FIGS. 50 and 51;

FIGS. 56, 56A and 56B show, respectively, a side view, a corresponding longitudinal sectional view, and a perspective view of yet a further preferred embodiment of a connector assembly according to the present invention;

FIG. 57 shows a perspective partially sectional view of a further preferred embodiment of a gasket according to the present invention comprised in the connector assembly of FIG. 56;

FIGS. 58, 59 and 60 show, respectively, a side view, a corresponding longitudinal sectional view, and a perspective view of a further preferred embodiment of a connector assembly according to the present invention; and FIGS. 61 and 62 show a perspective view and an exploded perspective view of a further preferred embodiment of a gasket according to the present invention comprised in the connector assembly of FIG. 60.

DETAILED DESCRIPTION OF THE INVENTION

With reference firstly to FIGS. 1, 1B, 2 and 2B, a gasket according to a first preferred embodiment of the invention is denoted as a whole by 1.

The gasket 1 is apt for use as part of a connector assembly allowing the sealed passage of a fluid through a wall. In particular, an assembly of this kind can be installed on a tank for drinking fluids, so as to place the internal compartment of said tank in communication with the outside environment.

In the present embodiment and also in the other embodiments described further below, the gasket is symmetrical with respect to its own longitudinal axis A.

The gasket 1 has a deformable region 11, apt to be elastically deformed once the gasket 1 itself has been introduced into a connector seat formed in the wall, bringing the gasket into a sealing configuration.

The gasket 1 has a substantially tubular design, so as to be placed within the aforementioned connector seat, passing through it from one side to the other. This design further allows a tubular connection element 5, shown in FIG. 2, to be passed through the gasket.

The gasket 1 preferably comprises, at one of its end sections, a first annular coupling portion 12 apt to cooperate with a gasket seat 21 of a ring nut portion 2 of the tubular element 5. The annular portion 12 has a rounded external profile for promoting the insertion within the seat 21 without becoming jammed and without generating additional stresses. The presence of the annular portion 12 allows an improved seal at high pressures.

Adjacently to said first coupling portion 12, the gasket 1 has the aforementioned deformable region 11, which in this exemplary embodiment has a partially bowed shape. In particular, this bowed shape is defined by two walls, in particular a first wall 111 and a second wall 112. The first wall 111 has an annular profile with substantially frusto-conical development, whereas the second wall 112 has an annular development of substantially cylindrical geometry. The walls 111 and 112 are longitudinally juxtaposed at the larger base of the truncated cone of the wall 111, defining, at said juxtaposition, a gasket portion of substantially greater cross-section compared to the adjacent portions, preferably the adjacent portions arranged above, indicated by 113. In accordance with further embodiments of the invention, this portion 113 has a cross-section substantially equal to that of the adjacent portions.

In a variant, the second wall 112 can also have a substantially frusto-conical development and can be juxtaposed with the first wall 111 at the larger base of the truncated cone, defining a substantially bowed geometry for the region 11.

As will be explained further below and as illustrated in detail in EP 1 301 739—incorporated herein by reference with regard to the aspect considered here—the bowed or partially bowed design of the region 11 promotes the deformation of the gasket 1.

In the present embodiment, the deformable region 11 also has a weakening notch 114 in the form of an annular groove formed preferably internally, and in some embodiments externally, on the gasket at said portion of greater section 113. The function of the internal weakening grooves is described in EP 1 301 739. An annular groove of this kind can of course have any profile in cross-section, for example squared, rounded, etc. In addition, a notch of this kind can be formed externally rather than internally on the gasket.

In accordance with the invention, the gasket 1 then has an annular centering portion, which is longitudinally contiguous with the second wall 112 and is denoted by 130, apt to cooperate with the tubular element 5 so as to allow the relative centering of the gasket with said tubular element. The centering portion 130 corresponds to an increase in the thickness of the gasket, and in particular can be obtained in the form of a thickening of the walls protruding towards the inside of the gasket, the magnitude of which is shown by a dimension 131 in FIG. 1B. As a result of this thickening, the portion also ensures a certain ability to grip the tubular element 5.

The central portion 130 has a preferably rounded internal edge 132.

The gasket 1 then has a terminal portion 14 shaped in the form of an annular flap.

Figure 1B:
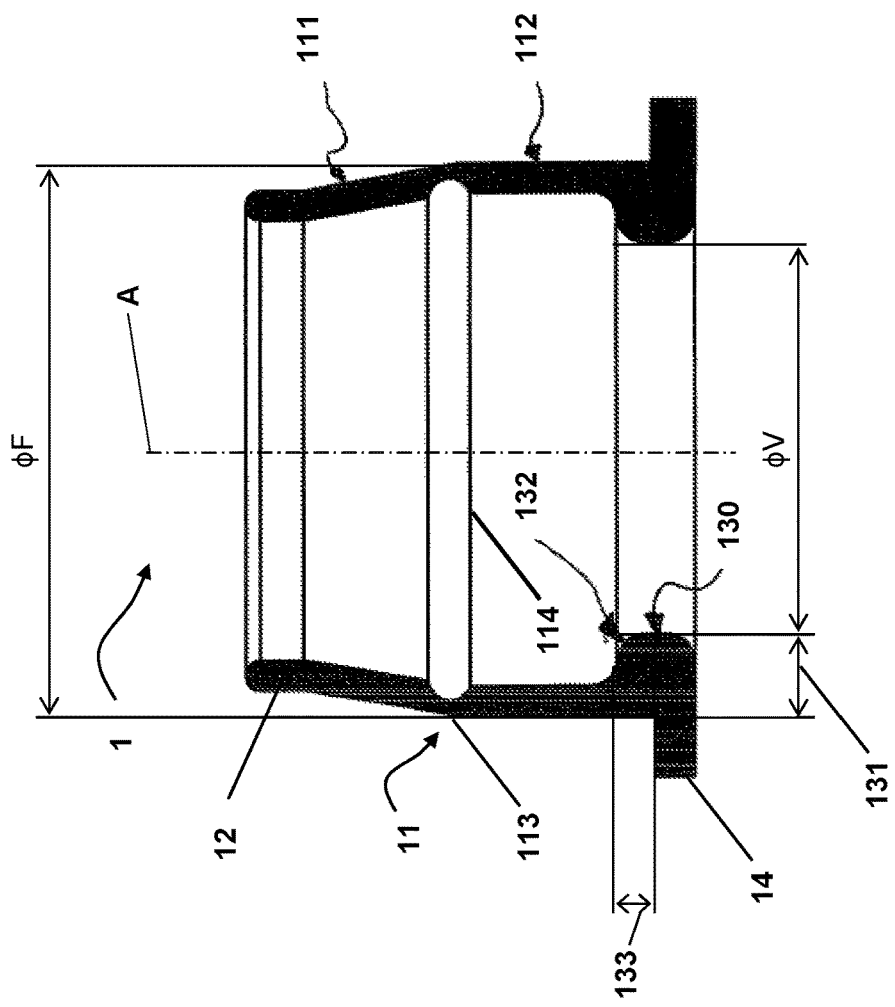
FIG. 1B shows a longitudinal sectional view of the gasket of FIG. 1, taken along the line B-B of the latter figure.
Figure 1:
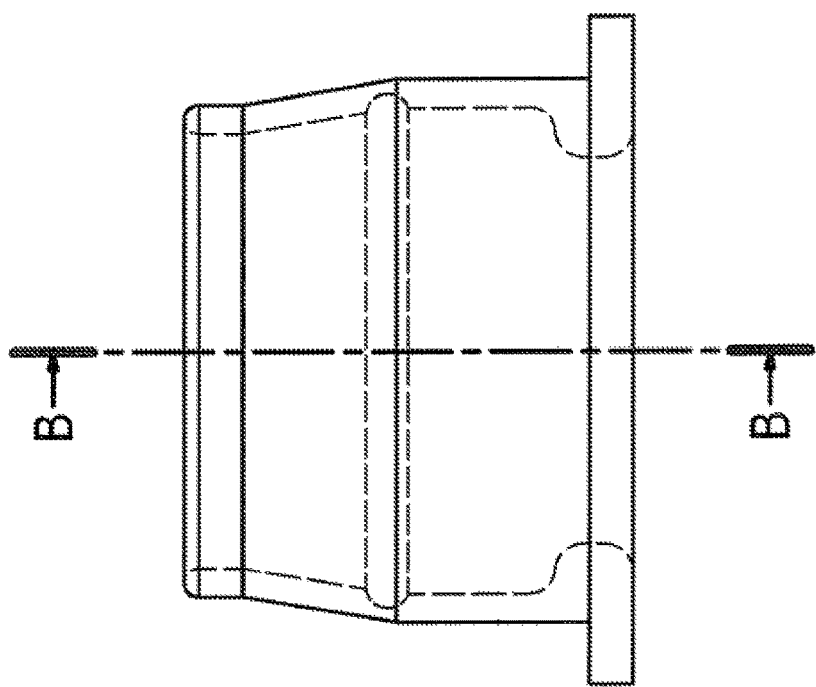
FIG. 1 shows a side view of the gasket in accordance with a preferred embodiment of the present invention, with internal profiles (not visible) shown by dashed lines.

In particular, the centering portion 130 can have a height, that is to say an extension along the longitudinal axis A, greater than the height of said flap 14 by an amount indicated in FIG. 1B by a dimension 133. The dimension 133 can be varied as a function of the thickness of the wall in which the connector is intended to be used, said thickness in particular increasing with an increase in the thickness of the wall.

The gasket 1 is preferably made of slip-resistant and tear-resistant non-toxic rubber by molding methods well known to a person skilled in the art. Variants provide the use of alternative resiliently deformable materials, such as cork or aluminum.

Figure 2B:
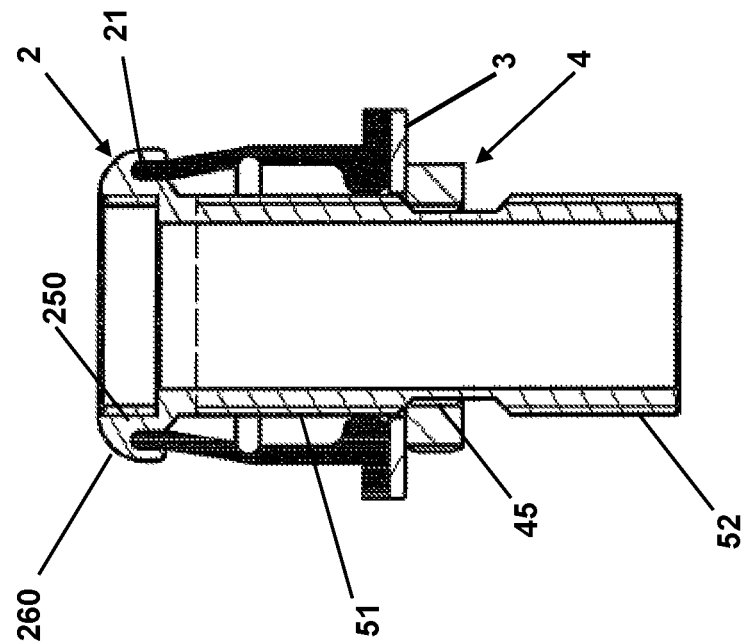
FIG. 2B shows a longitudinal sectional view of the gasket with connector assembly of FIG. 2, taken along the line B-B of the latter figure.
Figure 2:
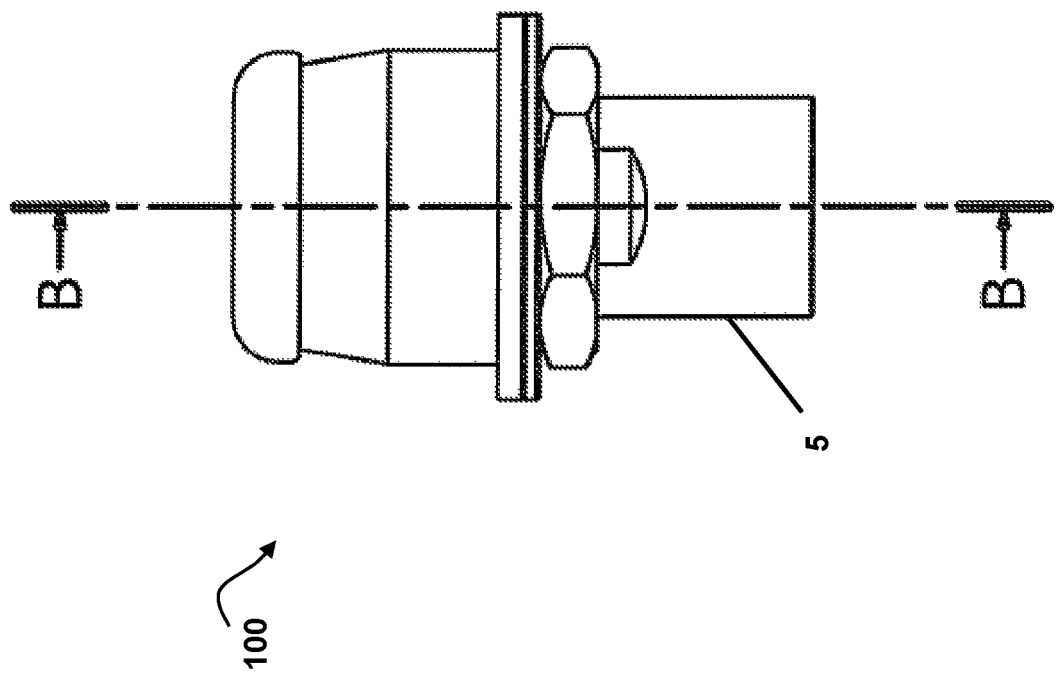
FIG. 2 shows a side view of the gasket of FIG. 1 inserted in a relative connector assembly.

With reference now more specifically to FIGS. 2 and 2B, the gasket 1, as mentioned, is apt for use as part of a connector assembly, denoted on the whole by 100.

An assembly of this kind comprises, in addition to the gasket 1, the tubular element 5 already mentioned above.

In the present embodiment, the tubular element 5 has the aforementioned ring nut portion 2, which forms an internal locking element of the assembly 100 as a whole, since said portion, in cooperation with the gasket 1, is apt to lock the tubular element 5 in place from the internal side of the tank wall.

The ring nut portion 2 has an internal female screw thread 250, apt to cooperate with further components.

The ring nut portion 2, at one terminal cross-section, also has the aforementioned gasket seat 21, apt to receive the first coupling portion 12 of the gasket 1. In the present exemplary embodiment, said gasket seat 21 is provided in the form of an annular groove partially circumscribed around the female screw thread 250. In this case as well, the gasket seat 21, and also the corresponding first coupling portion 12 of the gasket 1 itself, can have different profiles, for example squared or rounded, so as to satisfy specific sealing requirements. In addition, the aforementioned gasket seat 21 might not be formed as a groove, but can be configured so that the first coupling portion 12 of the gasket 1 comes into abutment there against, for example the gasket seat 21 can be formed as a flat annular surface substantially orthogonal to the longitudinal axis A.

At the opposite terminal section, the ring nut portion 2 additionally has a beveled external profile 260, preferably of circular profile.

In accordance with a variant, the tubular element and the internal ring nut can be formed as separate components and can be connected by means of a thread.

The ring nut portion 2 is also part of a means for deforming the gasket 1.

Said deformation means additionally comprise an external locking element, in particular an external ring nut 4, apt to lock the tubular element 5 in place from the external side of the tank wall so as to prevent the tubular element from moving towards the inside of the tank itself. For the purposes of connection to the ring nut 4, the tubular element 5 has a longitudinal portion with an end carrying a first thread 51.

The tubular element 5 also carries a second thread 52, which is disposed at the other longitudinal end, for connection to another tank or to other fluid transfer means, for example a tap, a pipe, or a pump.

In the present example, the first and second thread 51 and 52 are formed by means of a single processing operation as part of the same thread and are separated by maneuvering notches 45 visible for example in FIG. 2B.

In addition, the internal surface of the tubular element 5 can be shaped, providing a reduction in diameter or contact portions to allow a non-return valve to be accommodated.

As already mentioned, the application of the invention to walls of a tank is presented here merely by way of example, insofar as the invention can be applied effectively to walls of any nature. To this end, the terms "internal" and "external" as used herein can also be used in the case of further applications of the invention in order to distinguish in a simple and efficient manner between the two faces of a corresponding wall to be connected.

The means for deforming the gasket 1 also comprise an intermediate coupling element between the external locking device, specifically the ring nut 4, and the gasket 1, which intermediate coupling element in the present exemplary embodiment consists of a washer 3.

The washer 3 is shaped in the form of a flat ring, with an internal opening of such a diameter so as to allow the passage of the tubular element 5. A washer 3 of this kind has, at least on its face apt to come into contact with the external ring nut 4, a low coefficient of friction. To this end, the washer 3 can be made of smooth metal, for example brass, or a plastics material.

The operating principle of the connector assembly 100 will now be described with reference to FIGS. 2, 2B and 3.

Firstly, the assembly 100 is assembled by inserting the gasket 1, the washer 3, and the ring nut 4 in this order onto the tubular element 5 and connecting said components to one another in the manner already described.

At this stage, for the purpose of ensuring the quality of the final installation, the presence of the centering portion 130 plays a fundamental role.

The assembled installation configuration thus obtained is shown in FIGS. 2 and 2B. It shall be understood that in this installation configuration the gasket 1 is substantially undeformed.

Figure 3:
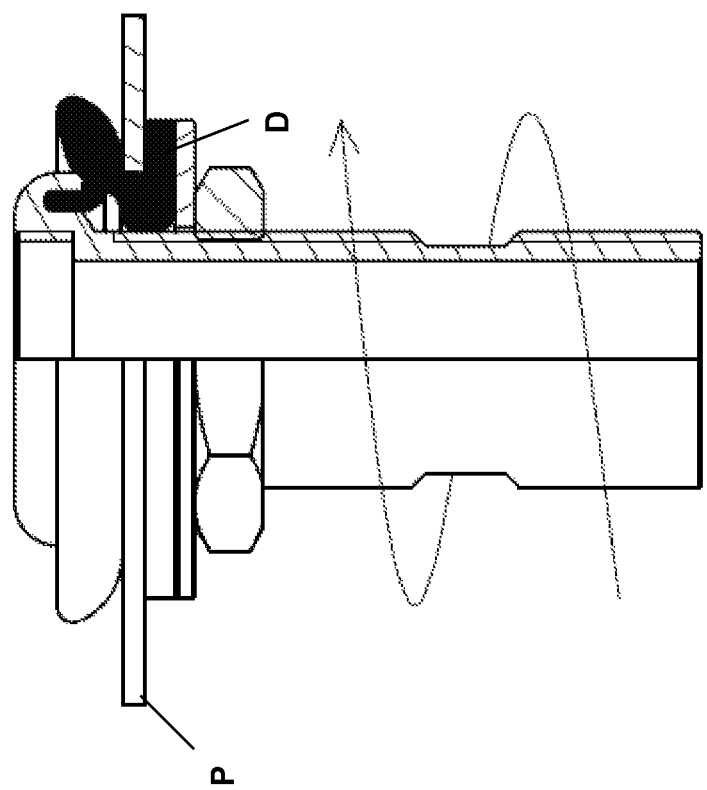
FIG. 3 shows the connector assembly of FIG. 2 in an installation configuration in which the gasket is deformed.
Figure 4:
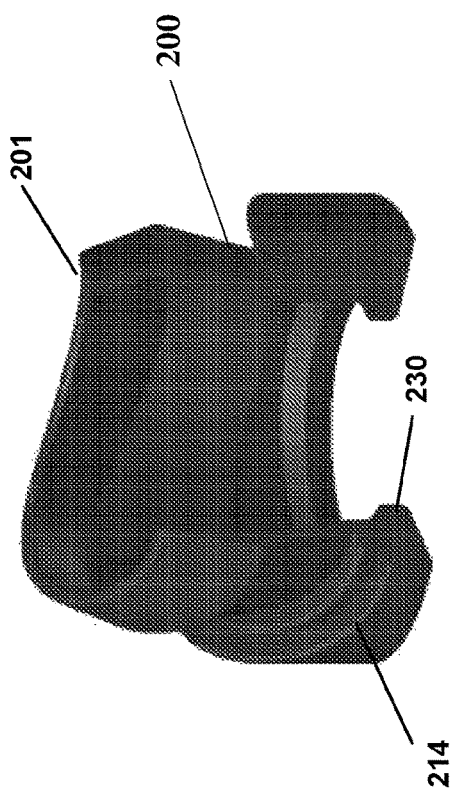
FIG. 4 shows a perspective view of a gasket in accordance with another preferred embodiment of the present invention, with a removed portion in order to show the internal profiles.
Figure 6A:
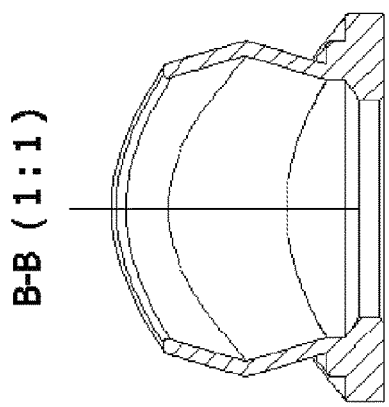
FIGS. 5A and 6A each show a respective longitudinal sectional view of the gasket of FIG. 4, taken respectively along the lines A-A of FIG. 5 and B-B of FIG. 6.
Figure 6:
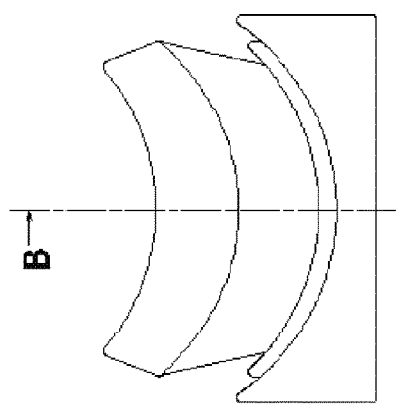
FIGS. 5 and 6 each show a respective side view of the gasket of FIG. 4.
Figure 5A:
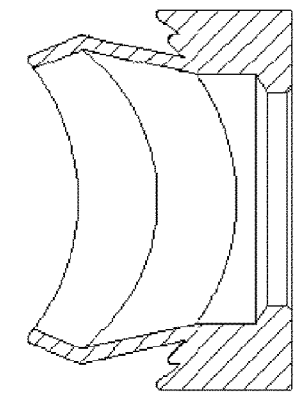
Figure 5:
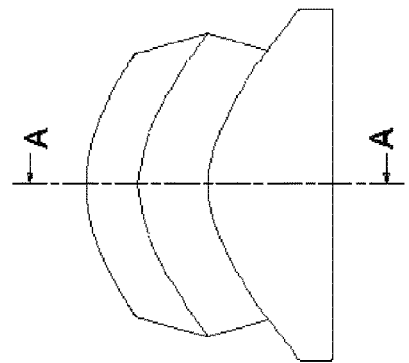
Figure 8:
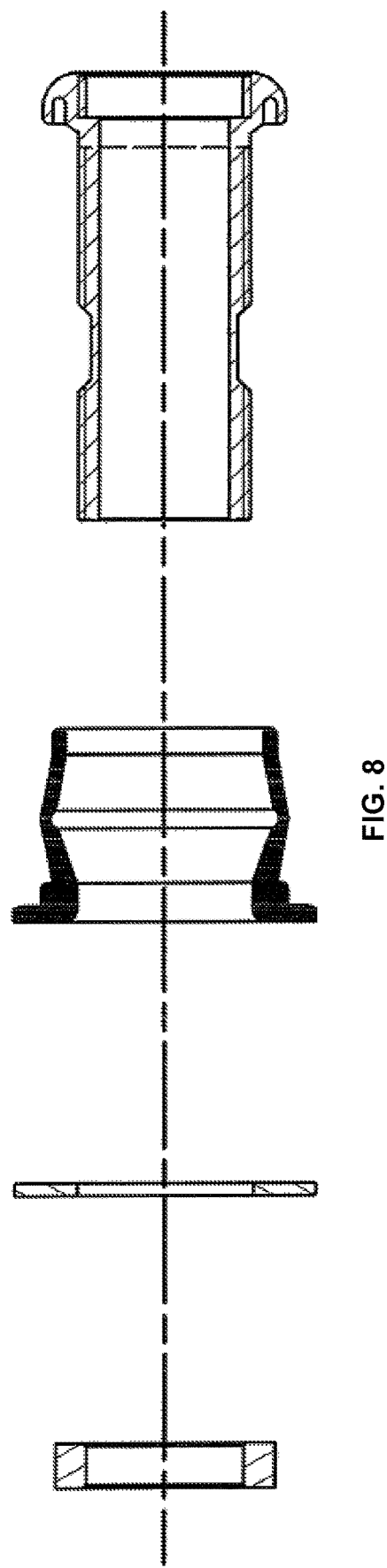
FIG. 8 shows an exploded and sectional view of a connector assembly comprising the gasket of FIG. 7.

With regard to the installation, it is firstly necessary to form the aforementioned connector seat, denoted by D in FIG. 3, for the assembly 100 in a wall of the tank, this being denoted by P. The tank for example can be of the type that provides drinking water to be conveyed in mains water pipes.

Said connector seat D, in the form of a through-hole of substantially circular section, can be formed by means of a hole saw of conventional type. The seat should have a diameter substantially comparable to, specifically substantially equal to, or slightly larger than or slightly smaller than (to an extent of at most a few millimeters), the diameter of the ring nut portion 2, so as to allow said ring nut portion to pass through the seat itself. If the diameter of the seat is smaller than that of the portion 2, it will be necessary to force said portion through the seat. Such requirements are perfectly compatible with the properties of accuracy and precision of currently available hole saws, which typically have an excess margin of error with respect to the nominal measurement of approximately 0.4 mm.

Once the connector seat has been formed in the wall, the processing residues are removed, and the edges of the seat are slightly smoothed, for example using an abrasive sheet. This is necessary to avoid any sharp surfaces, which could tear the gasket 1 once this has been installed.

The entire connector assembly 100 can therefore be inserted into the connector seat from outside the tank. In particular, the ring nut portion 2 and the gasket 1 are passed through the seat until the deformable region 11 of the gasket 1 is arranged on the internal side of the wall and the flap portion 14 is in abutment against the external face of the wall.

It shall be understood that, although the deformable region 11 of the gasket 1 can have a maximum diameter slightly greater than that of the connector seat, it can be passed through the seat anyway, thus being deformed manually.

At this point, it is necessary to actuate the deformation means in order to bring the connector assembly 100 and in particular the gasket 1 into the sealing configuration. To this end, it is sufficient to rotate the external ring nut 4 in a direction apt to advance it towards the inside of the tank, this being a clockwise direction in the present embodiment, indicated by an arrow in FIG. 3. At the same time, rotation of the tubular element 5 is prevented, for example by locking the tubular element in place using a suitable key. Since the external ring nut 4 is already in abutment, by means of the washer 3 and the annular flap portion 14, against the wall of the tank, it cannot be advanced towards the inside of the tank itself. Thus, the aforementioned rotation of the external ring nut 4 produces a movement in translation of the tubular element 5, which moves from the inside to the outside of the tank relative to the external ring nut 4.

Following the rotation of the external ring nut 4, the gasket 1 is subjected to a compressive force. In fact, the gasket 1 is locked at one end, at its flap portion 14, against the external face of the wall, and is locked at the opposite end, at its first coupling portion 12, within the ring nut portion 2. Thus, any advance towards the wall of the ring nut portion 2, pushing the first coupling portion 12 towards said wall, causes the gasket 1 to deform. In particular on account of said advancing movement and on account of the abutment of the portion of larger section 113 against the mouthpiece of the connector seat, the first wall 111 is pushed towards the second wall 112, so as to fold over thereon, twisting at the portion of larger section 113 and at the weakening notch 114 within said portion. In this deformed state, the gasket 1 opposes any further advancing of the tubular element 5 towards the outside of the tank.

The operator on the outside, perceiving the rise in resistance to rotation of the external ring nut 4, is made aware of the fact that the connector assembly 100 has been brought into the desired sealing configuration, and does not further force the external ring in rotation.

At this point, it can be better appreciated how the gasket 1 of the invention, deformed in the above-mentioned sealing configuration, provides a tight seal internally of the tank. This is achieved thanks to the presence of the deformable region 11. In particular the bowed shape of said region causes the gasket 1 to bend in the desired way, directing in this direction the compressive forces generated by the rotation of the external ring nut 4.

In addition, the presence of the central portion 130 plays a fundamental role, said portion, in the various installation operations described herein and in a particularly durable manner, assuring the deformation of the gasket and a tight and robust seal of the gasket on the tubular element 5.

Again, the presence of the second wall 112 of the deformable region 11 and of the annular centering portion 130 guarantees the univocal centering of the gasket 1, and therefore of the connector assembly 100, in the connector seat formed in the wall.

At the same time, the seal at the external mouthpiece of the seat is assured by the aforementioned flap portion 14, whilst the central portion of the gasket 1 ensures a seal along the internal wall of said seat.

It will better understood at this point how a single worker, working from just one side of the wall, can quickly assemble and install the connector assembly according to the invention, simply tightening the external ring against the wall.

FIGS. 4 to 6A show an alternative embodiment of the gasket of the invention.

As is also the case for the further embodiments of the invention that will be described hereinafter, this embodiment will be illustrated solely with reference to the aspects that distinguish it from the first embodiment described hitherto.

The gasket of this second embodiment, denoted by 200, is designed for installation on walls having an arcuate profile. To this end, the gasket comprises, in the portion apt to be placed on the inside of the wall, a double-curved end profile defining a central depression 201. The same profile is repeated at an abutment flap 214 with a function similar to that already described.

In accordance with the invention, the gasket 200 also has an internal centering portion 230 with a profile that in this case is tapered inwardly and in particular is substantially wedge-shaped.

FIGS. 7 to 9C relate to a third embodiment of the invention. In this case, the gasket is denoted as a whole by 300.

In contrast to the first embodiment, in this third embodiment the internal profiles (or faces) 302 and external profiles (or faces) 303 of the deformable wall 312 are not substantially parallel, but inclined, and the internal profile 302 has a greater inclination α relative to the longitudinal axis A of the gasket (the vertical in FIG. 7A) compared to the similar inclination β of the external profile 303. This means that the thickness of the wall increases towards the lower flap, denoted in the present case by 314.

The choice of inclined profiles guides the deformation of the gasket in the sense of promoting the folding over of the "internal" portion (upper portion in FIG. 7) of the gasket within the "external" portion (lower portion in FIG. 7), as shown in FIG. 9C.

The similar internal profile 304 and external profile 305 of the first wall 311 are instead substantially parallel.

The gasket 300, in accordance with the invention, has a centering portion 330, which is formed by a thickening of the wall inwardly and in the present example is formed with a substantially vertical continuation of the lower edge of the internal profile 302.

In this example as well, the gasket 300 has a rounded upper end profile 320 and a weakening notch 334 similar to those already described with reference to the first embodiment.

The gasket 300 then provides a lower internal profile 332 corresponding to the centering portion 330, which is also rounded.

FIGS. 10 to 10B relate to a fourth embodiment of the invention, in which the gasket is denoted as a whole by 400.

As in the previous cases and in those hereinafter, this embodiment is illustrated solely with reference to the aspects distinguishing it from the first embodiment described hitherto.

With reference to FIG. 10, in contrast to the first embodiment, in the fourth embodiment the internal profile (or face) 402 of the deformable wall 412 is not parallel to the external cylindrical profile 403, but has an inward inclination γ of the gasket relative to the longitudinal axis A (the vertical in FIG. 10).

This means that the thickness of the wall increases towards the lower flap, in the present case denoted by 414.

The inclined profile of the internal face 402 makes it possible to form a reinforcement at the flap 414 and facilitates the folding over of the "internal" portion (upper portion in FIG. 10) of the gasket 400 within the "external" portion (lower portion in FIG. 10).

FIG. 10A shows the enlarged detail of the lower rounded edge of the centering portion, whereas FIG. 10B shows the enlarged detail of the rounded upper end profile 420.

FIGS. 11 to 11B relate to a fifth embodiment of the invention, in which the gasket is denoted as a whole by 500.

As shown in FIG. 11, the upper end profile 520 and the internal profile of the centering portion 530 are aligned in a vertical direction V parallel to the longitudinal axis A, that is to say are both tangent to the surface of a cylinder corresponding to the footprint of the tubular connection element 5 (shown in FIG. 2), in particular at the external diameter of the first external thread 51 of the tubular element 5. To allow easy passage of the gasket 500 on the tubular element 5, a suitable coupling tolerance is provided.

With reference to the enlargement of FIG. 11A, it can be provided that the lower flap 514 has a curved upper surface 515, which faces the deformable region 55, for providing a convex and bowed profile. The curved flap 514 allows the gasket 500 to ensure the seal even at high pressures, deforming the gasket resiliently when said gasket is introduced within a connector seat formed in a wall and brought into a sealing configuration.

In particular, the upper surface 515 can have a course that follows one or more curved profiles. In the example of FIG. 11A, the curved profile of the surface 515 is singular.

The gasket 500 preferably does not have the annular coupling portion indicated by 12 in FIG. 1B. This difference makes it possible to provide a more competitive product in economical terms insofar as the work involved in providing the neck corresponding to an annular portion of this kind is spared, and in addition makes it possible to use plastic connectors, in which the formation of such a seat would otherwise be very difficult and costly because it would involve post-molding turning operations.

The absence of an annular portion of this kind also makes it possible to avoid errors in the assembly phase originating from an insertion error of the portion 12 on the tubular element 5. Thus, the assembly is rapid and can be automated insofar as, when the gasket 500 is inserted on the tubular element 5, said gasket is centered without any possibility of error.

The embodiments of the gasket 600, 700 illustrated in FIGS. 12, 12A and 13, 13A show the presence of a weakening notch 614, 714 of the deformable region 66, 77, in the form of a groove formed on the external surface of the body of the gasket. The external groove is preferably formed at the juxtaposition between the first wall 611, 711 and the second wall 612, 712.

In addition, such embodiments also have a further weakening notch 615, 715 in the form of an internal groove, at the juxtaposition between the second wall 612, 712 and the flap-shaped terminal portion 64, 74.

The enlarged views of FIGS. 12A and 13A make it possible to better appreciate the shaping and the positioning of the external groove 614, 714 and internal groove 615, 715; such positioning can be mutually reversed (external groove formed at the juxtaposition between the second wall 612, 712 and the terminal portion 64, 74 and internal groove formed at the juxtaposition between the first wall 611, 711 and the second wall 612, 712 of the deformable region 66, 67). In addition, the presence of further weakening notches other than those shown in the above-mentioned FIGS. 12 and 13 can be provided, that is to say the gasket as a whole can carry one or more external notches and one or more internal notches.

The combination of the presence of an external groove 614, 714 and an internal groove 615, 715 allows the correct deformation of the gasket 600, 700 when used at high pressures.

In fact, for very high pressures, it is necessary to use gaskets that have a greater hardness and therefore a greater sealing strength. However, increasing the hardness increases the resistance of the gasket to deformations. For example, particularly for gaskets that have a hardness greater than 70 ShA (Shore A hardness), the resistance is such that it does not allow deformation. In this case, the gasket would not be deformable if it had only one internal weakening notch. The introduction of an external weakening notch cooperating together with an internal notch allows the correct deformation of gaskets that have high hardness values and that are suitable for ensuring the seal at high pressures. More specifically, when the notch is an external notch and is formed at the point of greater resistance to deformation of the gasket, that is to say at the juxtaposition between the first and second walls of the deformable region, this helps to significantly reduce such a resistance and allows the correct deformation of the gasket.

In particular, the weakening notches are advantageous insofar as they contribute to the correct functioning of the gasket. The notches are preferably positioned at the points of greater mechanical stress caused by the deformation, that is to say at points of inflection of the deformable region of the gasket, at the juxtaposition of the first and second walls of the deformable region. Such positioning mitigates the stresses that are produced during the tightening phase, providing the gasket with an enhanced performance and making it easily deformable in respect of a minor applied deformation force. In this way, it is possible to perform a rapid tightening by means of an electrical screwdriver. In any case, the presence of notches positioned in this way does not increase the likelihood of rupture or tearing of the gasket.

Further embodiments of the invention that have particularly advantageous preferred technical features will now be described. Such embodiments will also be described exclusively in relation to the differences from the embodiments already presented.

FIGS. 14 and 14A show a connector assembly in which the tubular element 50 has a reinforcement rib 501, which extends in the same direction of longitudinal development as the tubular element 50. This solution can make it possible to increase the strength of tubular elements made of a plastics material.

The alternative embodiment of a tubular element of FIGS. 15 and 15A instead shows a tubular element 5000 having, internally, a step-like change in diameter apt to form an annular surface over a plane substantially transverse to the direction of longitudinal development of the tubular connection element, against which surface a non-return valve inserted into the tubular element can be placed in abutment.

The same feature is present in the tubular element 6000 shown in FIGS. 16 and 17, which in addition has a gasket seat 621 not formed as a groove, but configured such that the first coupling portion 612 of the gasket is in abutment against said seat. The abutment of the gasket against the gasket seat 621 is shown more clearly in the enlarged view of FIG. 18.

The internal flange of the tubular element has a diameter larger than that of the gasket abutted there against so as to prevent the gasket from having any overhanging excess length and thus deforming incorrectly.

More specifically, the effect created is that the gasket seat 621 and the first coupling portion 612 remain in contact for the entire duration of the installation in a fully tightened manner; moreover in the manner of joint. The enlargement of the diameter of the internal flange means that the cylindrical wall of the gasket subtends the truncated cone.

This cylindrical portion is preferably not adjacent to the thread for two main reasons:
 to allow the centering of the assembly and
 to reduce the stresses generated on the gasket, making it possible for the gasket to be installed by means of electrical screwdriver.

FIGS. 19 to 20D show an embodiment of the gasket according to the invention, denoted by 99, designed for installation on walls having an arcuate profile. To this end, the gasket, in the portion apt to be placed on the inside of the wall, has a double-curved end profile, preferably also repeated at an abutment flap 914 with a function similar to that already described. In addition, the gasket 99 has a weakening notch 915 in the form of an internal groove at the juxtaposition between the second wall 912 and the first wall 911.

With reference to FIGS. 21 to 22, another further embodiment of a gasket 220 according to the present invention is shown.

The gasket 220 has a partially bowed shape. In particular, this partially bowed shape is defined by a first wall 211 and a second wall 212. The first wall 211 has a profile with curved development in a sectional view along the longitudinal direction A, or substantially in accordance with a spherical segment, whereas the second wall 212 has an annular development with substantially cylindrical geometry. In particular, the first wall 211 is shaped in the manner of a spherical segment and has a diameter that decreases towards the terminal end of the gasket inserted within the wall to be connected. The two walls 211 and 212 are juxtaposed at the portion of the first wall 211 of greater diameter, in particular the diameter of the second cylindrical wall 212 being equal to the greater diameter of the first wall 211. In accordance with preferred embodiments of the invention, both the spherical wall and the cylindrical wall can have mutually inclined internal and external surfaces, that is to say said walls can have a variable thickness, which in particular decreases towards the terminal end of the gasket inserted in the wall.

In this embodiment, the upper end profile 222 and the internal profile of the centering portion 232 are preferably aligned in a vertical direction V parallel to the longitudinal axis A. In the enlarged detail of FIG. 22, the rounded upper end profile 222 can be better seen.

FIGS. 23 to 24A show, by way of example, a preferred embodiment of a connector assembly according to the invention inserted in the wall of a pipe, comprising a gasket according to the embodiment shown in FIG. 19.

With reference to FIG. 25, a further preferred embodiment of a tubular element of the connector assembly according to the invention, denoted by 5001, is shown in a perspective, partially sectional view. This embodiment is designed to provide a coupling with the preferred embodiment of the gasket denoted by 99, shown in FIG. 19.

The tubular element 5001, at a first longitudinal portion end, has a ring nut portion 5022, which ring nut portion 5022 has a double-curved profile at the end intended to be coupled to the gasket. This profile is configured to mate, during use, with the double-curved end profile of the gasket denoted by 99. In particular, during use, the protruding portions of the end of the gasket will abut against the inwardly curved portions of the end of the tubular element, and vice versa— the portions of the gasket and of the tubular element intended to be coupled to one another during use will be referred to hereinafter as complementary curved portions. The profiles of the tubular element 5001 and of the gasket 99 are asymmetrical, and therefore the coupling between the tubular element 5001 and the gasket 99 is performed correctly when the reciprocal orientation between said components is such that the respective complementary curved portions mate with one another.

With reference to FIGS. 26 and 26A, the gasket 1000 has a substantially bowed deformable region. In particular, this bowed form is defined by a first wall 1011 and a second wall 1012, both having an annular profile of substantially frustoconical development, with preferably constant thickness. The walls 1011 and 1012 are juxtaposed longitudinally at the with larger bases of the truncated cones, defining, at said juxtaposition, a gasket portion of cross-section substantially greater than the adjacent portions above, denoted by 1013. The walls 1011 and 1012 are preferably substantially symmetrical with respect to said portion 1013.

In addition, the gasket 100 has an upper end profile 1022 developed in the manner of a portion that is substantially cylindrical along the direction of the axis A, preferably from the non-rounded end edge, as can be seen in FIG. 26A.

In contrast to the gasket 1000, FIGS. 27 and 27A show an embodiment of a gasket 2000 that has a rounded upper end profile 2022.

The embodiment 2000 relates to a gasket having a centering portion of reduced internal diameter compared to the embodiments described beforehand. In fact, according to the embodiment 2000, the centering portion is not obtained as a thickening of the wall protruding towards the inside of the gasket.

In particular, the reduction of the internal radius δx of the centering portion 1130 compared to the central portion 130 of FIG. 1B is illustrated in FIG. 27A. The reduction δx is preferably equal to approximately 2.5 mm, that is to say equivalent to a corresponding reduction of diameter equal to approximately 5 mm as a result of this reduction mm.

As a result of this reduction of internal diameter, play between the gasket and the tubular element when these are assembled together is substantially eliminated. This makes it possible to use a tubular element of smaller diameter and consequently to form a hole of smaller diameter in the wall for the installation of the connector assembly comprising the gasket, with the same clear passage of fluid through the tubular element.

This solution advantageously increases the sealing ability of the gasket at high pressures, this capacity being a function of the diameter of the hole.

On average, an increase of the seal of the gasket of approximately 30% is obtained compared to the other embodiments, this being variable depending on the hardness of the gasket.

In other words, with constant hardness of the gasket, the smaller is the diameter of the connector, the smaller is the diameter of the hole in the wall and the greater is the increase in the seal under pressure.

With reference to FIGS. 28 and 28A, a further preferred embodiment of a connector assembly according to the present invention is shown, comprising the gasket 2000 shown in FIG. 27.

By way of non-limiting example, a preferred method for calculating the external diameter of a gasket according to the present invention will be presented hereinafter.

With reference to the accompanying FIG. 1B, the following geometric parameters are defined:

$\phi V$=external diameter of the thread of the tubular element to be inserted within the gasket; dependent on the type of thread structure used.

$\phi F$=external diameter of the gasket, corresponding to the diameter of the flange of the tubular element and to the diameter of the hole formed in the wall (it should be noted that in practice this parameter must be adjusted to the dimensions of commercial cutters, and therefore can be subject to variations in the order of a few millimeters compared to the value calculated using the formula presented here).

S=thickness of the gasket, generally $0.1 \leq S \leq 12$

X=constant, typically $2 \leq X \leq 8$

The applied relationship to calculate the external diameter of the gasket is:

$$\phi F = \phi V + X \cdot S$$

The table below shows preferred values of the external diameter $\phi F$ that can be selected in practice with a tolerance of +/−5 mm compared to those specified in the table, whilst still guaranteeing an effective seal of the connector assembly.

| Thread [inches] | φF [mm] |
| --- | --- |
| ⅛" | 14 |
| ¼" | 19 |
| ⅜" | 24 |
| ½" | 29 |
| ¾" | 35 |
| 1" | 43 |
| 1"¼ | 52 |
| 1"½ | 59 |
| 2" | 70 |
| 2"½ | 89 |
| 3" | 100 |
| 3"½ | 114 |
| 4" | 133 |
| 5" | 160 |
| 6" | 185 |

Further preferred embodiments of the invention which in particular make it possible to solve the problems associated with the installation of the connector assembly in pipes that have a curvature different from zero (non-rectilinear pipes) will be described hereinafter.

In addition, the embodiments described hereinafter make it possible to significantly increase the seal under pressure of the connector, with constant diameter of the branch hole.

Again, the preferred embodiments of the connector assembly described hereinafter can be advantageously installed on pipes using an electrical screwdriver. This tightening method is of benefit insofar as it makes it possible to reduce the time required for installation of the connector assembly to approximately 3-10 seconds (provided that the installation hole has already been formed).

For brevity, the embodiments of the invention hereinafter will be described exclusively in respect of the differences from the embodiments already presented above in the present description.

FIGS. 29 to 32 relate to a further embodiment of the invention in which the gasket is denoted as a whole by 80.

This gasket 80, at the abutment flap 84, which in the shown embodiment has a double-curved upper surface, can have one or more protruding elements 18, preferably a pair of protruding elements 18, which extend in a direction substantially orthogonal to the longitudinal axis A of the gasket 80. These protruding elements 18, which are preferably wedge-shaped, are preferably arranged symmetrically with respect to the axis A. The protruding elements 18 represent direction-indicating arrows, which when installed are arranged longitudinally with respect to the pipe to be connected and have a variable length depending on requirements. In an alternative to that shown, they can be formed in a transverse direction and can be extended so as to form a semicircle that rests against the pipe. These elements 18 are advantageously used so as to allow correct positioning of the connector assembly on the pipe.

The gasket 80 has a first coupling portion 82 of substantially cylindrical geometry, and a deformable region 81 of substantially frusto-conical geometry. These regions can have walls of constant thickness along the axis A of development of the gasket. In an alternative, the respective internal and external walls of the coupling portion and/or of the deformable portion can have a mutually inclined course, that is to say the coupling portion and/or the deformable portion can have a variable thickness along the longitudinal axis of the gasket 80. In particular, the thickness can decrease starting from the coupling region towards the end profile of the deformable region. A progressive reduction in thickness of this kind helps and guides the gasket to achieve correct deformation.

The variable thickness of the gasket can be provided in just one of the two coupling or deformation portions, or in both, as shown in FIG. 30A.

At the portion of juxtaposition between the coupling region and deformable region, internal and/or external grooves can be provided (in the drawings an inner groove 85 is provided), preferably double-curved grooves. In particular, the thickness of the gasket at the groove 85 has a constant value (the thickness is calculated between the concavity of the groove and the external or internal surface of the gasket, and depending whether the groove is an internal or external groove). This constant value is necessary for correct deformation insofar as the tightening torque increases significantly, accordingly, as the thickness of the gasket increases. The constant thickness at the gasket makes the forces during the deformation homogenous, and therefore the tightening can be performed using an electrical screwdriver, because the tightening torque is comparable to that necessary to install a gasket of traditional type. An electrical screwdriver, however, cannot be used for excessively high torques.

FIG. 29A also shows a wedge 87 formed within a branch hole, from the external part of the gasket wall, in the tightening phase. This wedge can have a toroidal or double-curved geometry for the pipes.

The wedge is necessary insofar as there is often a problem of chipping of the external walls caused by the forming of the branch hole. More specifically, the teeth of the used cutters randomly chip the edges of the hole to a greater or lesser depth, and this can result in fluid losses.

In addition, at high pressures, a wedge of this kind maintains the seal of the gasket under pressure, even when the external flap portion 84 is separated from the external surface of the tank/pipe as a result of the effect of the pressure inside said tank/pipe.

With reference in particular to FIGS. 29A, 30A and 29B, it can be seen how the gasket 80 additionally has reinforcement ribs 8 on the internal surface of the centering portion 830, said ribs preferably being parallel and symmetrical with respect to the axis A, and even more preferably being tapered towards the deformable portion. Ribs of this kind can have chamfers at their ends in order to promote the assembly of the connector assembly during the production phase. In particular, the gasket 80 can also have a notch, on the internal surface of the gasket 80, at the juxtaposition between the coupling region and the deformable region, which notch is annular and preferably double-curved. Again, the terminal end portion of the deformable region 81 intended to be inserted in the wall to be connected has a flat circular profile substantially orthogonal to the axis A.

In addition, apart from the abutment flap 84 having a double-curved upper surface, the juxtaposition portion 83 between the flap 84 and the first coupling portion 82, and/or the juxtaposition portion 82 between the first coupling portion 82 and the deformable portion 81 can also be double-curved.

FIGS. 33 to 36 show a connector assembly according to the present invention, comprising a gasket 80 in accordance with that just described, in a configuration for installation in a wall having a curved profile.

As can be seen from FIG. 34A, the flat part of the connector represents a chord passing through the internal circumference. The lack of parallelism between the surfaces of the connector and the internal surfaces of the pipe could create a portion that is sealed with low pressures. This drawback is resolved with a gasket of variable section.

Still under consideration of FIG. 34A, the gasket has a minimum thickness at the cross-section passing through the pipe. In FIG. 35A the thickness of the gasket is greater in order to compensate for the gap between the curvature of the pipe and the flat part of the connector, viewed in longitudinal section of the pipe. That which has been described is shown in FIG. 36.

The increase in thickness is progressive from the cross-section of smaller thickness to the longitudinal section of greater thickness.

With reference to FIGS. 37 to 39 and FIG. 45, a further embodiment of a gasket according to the present invention is shown, denoted as a whole by 800 and intended to provide connections that are large in size.

The gasket 800 has a first coupling portion 882 of substantially cylindrical geometry, and a first deformable region 881a forming a main body 801. Further deformable regions 881b-881e of substantially frusto-conical geometry are also provided. These further deformable regions 881b-881e are substantially equal to one another and are arranged in alternation, such that the end of smaller diameter of each portion 881 is juxtaposed with respect to the end of smaller diameter of the next deformable portion. The coupling of two frusto-conical deformable portions 881 juxtaposed at the section of larger diameter defines a deformable module 118.

In particular, external notches can be provided at the juxtaposition of the end sections of larger diameter of the deformable portions 881 in each module 118 so as to facilitate the deformation thereof.

In accordance with the present embodiment, the gasket 800 has a modular composition insofar as it can have a plurality of deformable modules 118, juxtaposed at the section of smaller diameter, which modules can be repeated an arbitrary number of times. In particular, the number of modules 118 present in the gasket 800 is dependent on the dimensions of the connector to be provided. The gasket 800 comprising a main body 801 and a plurality of deformable modules 118 is preferably formed in a single body.

The regions 882 and 881 can have walls of constant thickness along the axis A of development of the gasket 800.

In an alternative, the respective internal and external walls of the coupling portion 882 and/or of the deformable portions 881 can have a mutually inclined development, that is to say said portions can have a variable thickness along the axis of longitudinal development A of the gasket 800. In particular, the thickness can decrease together with the reduction in diameter of the deformable regions and can decrease with an increase of the distance from the abutment flap 884 in the coupling region. A progressive reduction of thickness of this kind helps and guides the gasket to achieve correct deformation.

FIG. 45A shows a connector assembly comprising the gasket 800 in an installation configuration in which the deformable regions are as yet undeformed.

The connector assemblies shown in FIGS. 37A and 40A have been designed to meet the need to connect walls/pipes which have thicknesses and seals at different pressures.

Instead of solving this problem by using thicker gaskets, which would involve an increase in the diameter of the branch hole of the gasket with constant dimensions of the external thread, it is more advantageous to use a gasket of modular type, in which the overall length of the gasket is increased, that is to say the development along the longitudinal direction.

With the objective of providing a branch hole and external thread equal to those of a standard connector, and at the same time with the objective of increasing the seal under pressure and/or the seal over various thicknesses, the gaskets of FIGS. 38, 41 and 42 are proposed and will be described hereinafter.

FIG. 38 shows a modular gasket 800, formed in a single body, in which a deformable modular element is repeated a number of times, so as to have several sealed modules 118 in place of a single module. It is clear that as the thickness of the gasket increases, which opposes the further advance of the tubular element during the tightening phase, and also when the connector is installed, with a presence of n modules, a seal under pressure that is n times greater compared to a single module is provided. This is achieved with dimensions of the branch hole and external thread equal to those of a standard connector assembly.

The assembly of FIG. 37A can also be installed in very thick walls, using one or more modules depending on the thickness of the wall/pipe. In this case, the modules disposed within the hole, interposed between the external and internal walls, cannot expand. Thus, given the particular geometry, it is as if the rigidity has been increased, supporting the modules that instead are disposed inwardly of the wall and that can expand and provide the seal under pressure, with greater or lower sealing pressures depending on the number of modules used.

In particular, each module can be formed of one of the gaskets already described in the present description.

In addition, FIG. 39 shows a portion of increased thickness of the wall of the gasket at the portion of juxtaposition of two adjacent modules, which has the function of increasing the resistance of the gasket at this specific point, making it adhere, even under tightening force, to the thread element. This detail also promotes any tearing of excess gasket in the case in which it is desired to remove one of the modules used in a thin wall. It should be noted that internal grooves or notch elements could also be provided.

With reference to FIGS. 40 to 43 and FIG. 46, a further embodiment of the gasket according to the present invention is shown, denoted as a whole by 8000. This gasket 8000 has a main body, in the example of FIG. 40A corresponding substantially to a gasket according to the embodiment 400, which potentially can correspond to, or comprise, any type of gasket forming the subject of the present invention. At the external terminal end of the deformable region of this body 400, a further deformable region 88 can be installed. The two components formed by the main body 400 and further deformable region 88 are preferably formed in separate bodies, but could be formed in a single body in accordance with alternative embodiments. The further deformable region 88 comprises two symmetrical frusto-conical regions connected at the frusto-conical portion of larger section. The end portions of the further deformable region 88 have a circular profile with the same course and diameter as the end profile of smaller section of the main body 400, so as to make it possible to provide a stable coupling between the further deformable region and the main body 400.

In an alternative, the further deformable region 88 can have a substantially bowed geometry, with a central portion of greater diameter and end portions of smaller diameter.

It shall be understood that, depending on the dimensions of the connector to be produced, it is possible to juxtapose one or more further deformable regions 88 in series.

Substantially, the gasket of FIG. 40A represents a variant of the gasket of FIG. 38, in which the modules are separated (FIG. 41) and characterized by having two frusto-conical portions symmetrical with respect to the larger base of the truncated cone. The two upper and lower terminal ends of the module are rounded. Outer or internal grooves can be provided, as already described.

The separate modules can be used to:
produce seals under higher pressures compared to modular gaskets with a single body, with lower costs (a single mold for the modules rather than several molds for gaskets in a single body with a larger number of modules);
and
connect walls of greater thicknesses, in the order of around 10 cm. For walls greater than 10 cm, it is possible to use a second module of cylindrical shape, which is substantially undeformable, to be interposed between the main body 400 and the module 88. In this case the main gasket can be formed of a flat washer made of rubber which remains on the outside of the wall in which the connector assembly is installed and which can serve as a flap.

FIGS. 44 and 44A show a connector assembly comprising a gasket 8001' having three further deformable regions 88, in an installation configuration in which the deformable regions are deformed so as to assure the seal of the connector assembly.

FIG. 46A shows a connector assembly comprising the gasket 8000 in a configuration of installation in which the deformable regions are as yet undeformed.

FIGS. 44, 47, 48, 48A and 49 show a tubular element 8' shaped so as to engage with the gaskets according to the embodiments 808 and 8000, which for said purpose have an external thread.

As can be seen from FIGS. 44 and 44A, when a connector assembly with modular gasket for elevated pressures is used, an undesirably long thread structure can remain protruding from the external part of the wall.

FIGS. 48 and 48A show a threaded tubular element, which is also modular in the sense of having, along its direction of longitudinal development, threaded portions of a size equal to that of a deformable module, separated by short unworked portions.

As a result of this configuration of the tubular element, once tightened it is possible to cut the excess portion of tubular element at one of said separating gaps, without the thread structure being ruined by the cut.

For the purpose just described, a single thread structure is formed over the entire cylindrical surface of the threaded element. A long thread portion measuring a specific number of millimeters and extending over one or more revolutions is removed from the aforesaid single thread structure. In this way, by screwing an external ring nut onto the threaded element, this ring can move as if the thread structure were uninterrupted, whereas, once tightened, the excess modules can be removed without ruining the external thread structure, which is necessary for coupling with other connection members.

FIG. 49 shows an enlarged view of a threaded tubular element, in which the starting point 811 and end point 812 of the thread can be seen. The detail 813 is a small concavity serving as an indicator for cutting. This could also be provided without the convexity, but as a variation of a surface finishing, which for example is satin smooth.

With reference to FIGS. 50 to 54A a tubular element 80' is shown, having a connector with internal flange 88' which has a double-curved profile, both in the surface portion in contact with the gasket 99 and in the surface portion which bears against the inside of the wall when the connector assembly is installed, designed for coupling with a gasket 99.

FIG. 55 shows a connector assembly 8000' comprising a gasket 99 and a tubular element 80'.

FIGS. 56 to 56B show a further embodiment of an adjustable gasket 880 according to the present invention, comprised in a connector assembly 8800. The gasket 880 comprises a deformable module 118, already described with reference to the embodiment of the gasket 800, a tubular element 886, which in particular is cylindrical and is preferably made of a material that is more rigid compared to that of the module 118, and a main washer 887. The washer 887 is shaped so as to be coupled to a main surface of the cylindrical body 886 and preferably has an external diameter greater than that of the cylindrical element 886, such that it protrudes externally during use with respect to the lower surface of the cylindrical body and forms an abutment flap, intended to rest on the wall to be connected. In particular, the cylindrical element 886, at the two terminal ends, has preferably flat and parallel terminal surfaces, with the geometry of a circular crown, shaped so as to allow the washer 887 and the deformable module 118 to rest in abutment on these surfaces respectively. Such components as a whole form an adjustable gasket 880. The adjustability of the gasket 880 is inherent in the dimensioning, of the cylindrical element 886, in particular with regard to the length along the axis A. Said cylindrical element can be cut by the user depending on the thickness of the wall to be connected, so as to obtain the desired length along the axis A of longitudinal development.

The rigid cylinder can be made of rubber, plastic or other materials. Its purpose is to transmit the compressive force generated by the tightening torque when the connector assembly is installed and has reached a sealing configuration, which acts on the deformable module 118. The cylindrical element 886 can have a constant thickness S.

The cylindrical element 886 makes it possible to provide seals in walls having thicknesses ranging from a few millimeters to more than a meter, using economical materials and molds.

According to the present embodiment, one or more modules 118 can also be provided depending on the sealing requirements.

FIGS. 58 to 62 show yet a further embodiment of a gasket according to the present invention, denoted on the whole by 850.

This embodiment constitutes a variant of the embodiment denoted by 880.

The gasket 850 comprises a deformable module 118', which differs from the deformable module 118 already described in view of the fact that the external surfaces 851 and 852, which have a smaller diametric footprint, and/or the lateral surface 853 have a double-curved course. A potential external annular notch 856 also has a double-curved course. The gasket 850 also comprises a main washer 887', having a double-curved upper surface 888, and a tubular element 886', which is preferably cylindrical and which has two end surfaces which can both have a course that is not flat, but is double-curved, so that they are able to rest, respectively, on the deformable module 118' and on the main washer 887'. In particular, the surfaces with which the deformable module 118', the washer 887' and the cylindrical element 886' are intended to come into contact can have mutually complementary double-curved profiles so as to produce a stable coupling. In the embodiment shown in the drawings, the cylindrical element 886' has a lower end surface a, intended to be coupled with a corresponding seat of the washer 887', which is flat, and an upper end surface b, which has a double-curved development, complementary to the profile of the deformable module 118'. For clarity, the three components just described are shown in an exploded configuration in FIG. 61.

FIG. 62 shows a connector assembly 8850 in an exploded configuration, comprising a tubular element 80' and a gasket 850.

The present invention has been described hitherto with reference to preferred embodiments. It shall be understood that the various embodiments described above can be used in combination with one another, where possible.

In addition, it is possible that other embodiments may also exist, which are afforded the same scope of protection as defined in the accompanying claims.

The invention claimed is:

1. A connection assembly comprising
    a gasket for use with a connector assembly apt to allow the sealed passage of a fluid through a wall (P),
        which gasket has a substantially tubular structure, in such a way as to be traversed from side to side by a tubular element of the connector assembly, and comprises a deformable region defined by a first wall and a second wall,
        the overall configuration of the gasket being such that it the overall configuration of the gasket can assume:
            an installation configuration, in which said gasket can be introduced into a connector seat (D) formed in the wall (P), crossing it from side to side; and
            a sealing configuration, in which said gasket is installed in the wall (P) and deformed at said deformable region, in order to abut on an inside mouthpiece of the connector seat (D), and
    means for deforming said gasket, said means being apt to be actuated to deform the gasket in said sealing configuration,
    said gasket comprising
        an annular centering portion apt to allow the centering of the gasket with respect to the tubular element, which centering portion provides for an increase of thickness of the gasket, and
        a terminal portion shaped as an abutment flap apt to abut on an external mouthpiece of the connector seat (D),
        wherein said second wall has an internal face and an external face with a mutually inclined development, said internal face presenting a first inclination ($\alpha$) greater than a second inclination ($\beta$) of said external face with respect to a longitudinal axis (A) of said gasket, in such a manner that the thickness of said second wall increases towards said abutment flap and the overall configuration of said gasket being such that said first wall is configured to fold over said second wall in order to realize said sealing configuration.

2. The connection assembly according to claim 1, wherein said abutment flap has a curved upper surface with a double-curved profile determining a variable thickness of said abutment flap.

3. The connection assembly according to claim 1, comprising a first coupling portion for connection with an internal locking element apt to lock the tubular connection element on the internal side of the wall (P), said first coupling portion being apt to cooperate with a corresponding gasket seat of the tubular element.

4. The connection assembly according to claim 1, presenting a substantially bowed or partially bowed shaping at said deformable region.

5. The connection assembly according to claim 1, wherein said deformable region is defined by a first wall and a second wall, at least one of which having a substantially frusto-conical profile, juxtaposed at the section corresponding to the larger base of the truncated cone.

6. The connection assembly according to claim 5, wherein said first wall has a substantially frusto-conical profile and said second wall has a cylindrical profile.

7. The connection assembly according to claim 1, wherein said first wall has a profile with curved development or a profile substantially shaped as a spherical segment and said second wall has an annular development with a substantially cylindrical geometry, said first wall and second wall being juxtaposed at the section of greater diameter of said first wall.

8. The connection assembly according to claim 1, wherein said deformable region comprises at least one weakening notch formed internally or externally on the gasket.

9. The connection assembly according to claim 8, wherein said at least one weakening notch is an annular groove formed at a portion of greater section of said gasket.

10. The connection assembly according to claim 8, comprising, at an end portion of said deformable region apt to be set inside the wall (P), a double-curved end profile.

11. The connection assembly according to claim 10, wherein said at least one weakening notch has a double-curved development, having the same development of the double-curved end profile of said deformable region.

12. The connection assembly according to claim 1, wherein said abutment flap has an upper curved surface facing said deformable region, to realize a convex or bowed profile.

13. The connection assembly according to claim 1, comprising one or more reinforcement ribs at an internal surface of said centering portion, disposed symmetrically with respect to a longitudinal axis of symmetry (A) of said gasket.

14. The connection assembly according to claim 1, wherein said gasket comprise one or more further deformable regions, said deformable regions comprising two specular frusto-conical regions connected at a frusto-conical portion of larger section, wherein said first gasket and each of said one or more deformable regions are formed in separate bodies.

15. The connection assembly according to claim 1, comprising a tubular element, which tubular element has a ring nut portion at a first longitudinal end portion, which ring nut portion has a thread and has a gasket seat configured to receive a first coupling portion of said gasket.

16. The connection assembly according to claim 1, wherein said ring nut portion has a double-curved profile at a terminal end intended for coupling with said double-curved end profile of said gasket.

* * * * *